US012122188B2

(12) United States Patent
Shimizu

(10) Patent No.: US 12,122,188 B2
(45) Date of Patent: Oct. 22, 2024

(54) PNEUMATIC TIRE

(71) Applicant: The Yokohama Rubber Co., LTD., Tokyo (JP)

(72) Inventor: Masatoshi Shimizu, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 793 days.

(21) Appl. No.: 17/262,169

(22) PCT Filed: Jun. 4, 2019

(86) PCT No.: PCT/JP2019/022222
§ 371 (c)(1),
(2) Date: Jan. 21, 2021

(87) PCT Pub. No.: WO2020/021869
PCT Pub. Date: Jan. 30, 2020

(65) Prior Publication Data
US 2021/0291595 A1   Sep. 23, 2021

(30) Foreign Application Priority Data

Jul. 25, 2018   (JP) .................................. 2018-139823

(51) Int. Cl.
*B60C 11/03*   (2006.01)
*B60C 9/28*   (2006.01)
*B60C 11/12*   (2006.01)

(52) U.S. Cl.
CPC ............ *B60C 11/0304* (2013.01); *B60C 9/28* (2013.01); *B60C 11/1204* (2013.01);
(Continued)

(58) Field of Classification Search
CPC ............ B60C 11/1281; B60C 11/1272; B60C 11/1259; B60C 11/0304; B60C 11/1236; B60C 2011/0365; B60C 9/28
See application file for complete search history.

(56) References Cited

U.S. PATENT DOCUMENTS

2017/0028782 A1* 2/2017 Miyake ..................... B60C 9/20
2017/0036494 A1   2/2017 Ogawa
(Continued)

FOREIGN PATENT DOCUMENTS

JP      63180506 A  * 7/1988  ..... B60C 2011/0033
JP   2002-301914      10/2002
(Continued)

OTHER PUBLICATIONS

Machine translation of JP63-180506 (no date).*
International Search Report for International Application No. PCT/JP2019/022222 dated Aug. 27, 2019, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

In a tread portion of a pneumatic tire, an average lateral groove width Lc of a center region is obtained by dividing the groove area of lateral grooves in the center region by a circumferential length of the center region, and an average lateral groove width Lsh of a shoulder region is obtained by dividing the groove area of lateral grooves in the shoulder region by a circumferential length of the shoulder region. A relationship between a tire average thickness Gc of the center region and a tire average thickness Gsh in the shoulder region satisfies $1.05 \leq (Gc/Gsh) \leq 1.35$, a relationship between the average lateral groove width Lc of the center region and the tire average thickness Gc in the center region satisfies $0.07 \leq (Lc/Gc) \leq 0.12$, and a relationship between the average lateral groove width Lsh of the shoulder region and the tire average thickness Gsh in the shoulder region satisfies $0.17 \leq (Lsh/Gsh) \leq 0.26$.

10 Claims, 15 Drawing Sheets

(52) U.S. Cl.
    CPC ...... *B60C 11/1236* (2013.01); *B60C 11/1259*
              (2013.01); *B60C 11/1272* (2013.01); *B60C*
              *11/1281* (2013.01); *B60C 2011/0365*
              (2013.01); *B60C 2011/1213* (2013.01)

(56) References Cited

U.S. PATENT DOCUMENTS

| | | |
|---|---|---|
| 2018/0065417 A1 | 3/2018 | Hoshiba |
| 2019/0359006 A1 | 11/2019 | Uemura et al. |
| 2020/0276867 A1 | 9/2020 | Shimizu |
| 2021/0188013 A1* | 6/2021 | Morito ............... B60C 11/1259 |

FOREIGN PATENT DOCUMENTS

| | | | |
|---|---|---|---|
| JP | 2009-262808 | 11/2009 | |
| JP | 5567839 | 8/2014 | |
| JP | 2015-205583 | 11/2015 | |
| JP | 2015-214286 | 12/2015 | |
| JP | 2016-020109 | 2/2016 | |
| JP | 2016-028964 | 3/2016 | |
| JP | 2016-165981 | 9/2016 | |
| JP | 6540915 | 7/2019 | |
| WO | WO 2015/159576 | 10/2015 | |
| WO | WO 2015/174408 | 11/2015 | |
| WO | WO 2016/143642 | 9/2016 | |
| WO | WO 2017/141913 | 8/2017 | |
| WO | WO-2017141651 A1 * | 8/2017 | ......... B60C 11/0304 |
| WO | WO 2019/097927 | 5/2019 | |

* cited by examiner

| | CONVENTIONAL EXAMPLE | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 |
|---|---|---|---|---|---|---|---|---|
| TIRE AVERAGE THICKNESS: Gc/Gsh | 0.98 | 1.46 | 0.96 | 1.23 | 1.23 | 1.23 | 1.23 | 1.23 |
| AVERAGE LATERAL GROOVE WIDTH WITH RESPECT TO TIRE AVERAGE THICKNESS IN CENTER REGION: Lc/Gc | 0.15 | 0.10 | 0.10 | 0.15 | 0.10 | 0.10 | 0.10 | 0.10 |
| AVERAGE LATERAL GROOVE WIDTH WITH RESPECT TO TIRE AVERAGE THICKNESS IN SHOULDER REGION: Lsh/Gsh | 0.15 | 0.23 | 0.23 | 0.10 | 0.23 | 0.23 | 0.23 | 0.23 |
| RATIO BETWEEN ADJACENT PITCHES | 1.4 | 1.4 | 1.4 | 1.4 | 1.4 | 0.6 | 1.2 | 1.2 |
| LENGTH OF LATERAL GROOVE WITH RESPECT TO WIDTH OF CENTER LAND PORTION: WL/Wc | 0.8 | 0.8 | 0.6 | 0.8 | 0.8 | 0.8 | 0.6 | 0.3 |
| LATERAL GROOVES LOCATED IN CENTER REGION | NARROW GROOVE | NARROW GROOVE | NARROW GROOVE | NARROW GROOVE | NARROW GROOVE | NARROW GROOVE | NARROW GROOVE | NARROW GROOVE |
| RELATIONSHIP, FOR CHAMFERED SIPES LOCATED IN CENTER REGION, BETWEEN DEPTH OF CHAMFERED PORTION AND DEPTH OF SIPE PORTION: Dc1/Dc2 | - | - | - | - | - | - | - | - |
| RELATIONSHIP, FOR CHAMFERED SIPES LOCATED IN SHOULDER REGION, BETWEEN DEPTH OF CHAMFERED PORTION AND DEPTH OF SIPE PORTION 2: Dsh1/Dsh2 | - | - | - | - | - | - | - | - |
| POSITION OF CHAMFERED PORTION IS REVERSED BETWEEN ONE END SIDE AND OTHER END SIDE OF CHAMFERED SIPE | - | - | - | - | - | - | - | - |
| SHOCK BURST RESISTANCE PERFORMANCE | 100 | 102 | 99 | 99 | 103 | 102 | 104 | 105 |
| WET BRAKING PERFORMANCE | 100 | 99 | 101 | 100 | 101 | 101 | 101 | 100 |

FIG. 14A

| | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|
| TIRE AVERAGE THICKNESS: Gc/Gsh | 1.23 | 1.23 | 1.23 | 1.23 | 1.23 | 1.23 | 1.23 |
| AVERAGE LATERAL GROOVE WIDTH WITH RESPECT TO TIRE AVERAGE THICKNESS IN CENTER REGION: Lc/Gc | 0.10 | 0.10 | 0.10 | 0.10 | 0.10 | 0.10 | 0.10 |
| AVERAGE LATERAL GROOVE WIDTH WITH RESPECT TO TIRE AVERAGE THICKNESS IN SHOULDER REGION: Lsh/Gsh | 0.23 | 0.23 | 0.23 | 0.23 | 0.23 | 0.23 | 0.23 |
| RATIO BETWEEN ADJACENT PITCHES | 1.2 | 1.2 | 1.2 | 1.2 | 1.2 | 1.2 | 1.2 |
| LENGTH OF LATERAL GROOVE WITH RESPECT TO WIDTH OF CENTER LAND PORTION: WL/Wc | 0.6 | 0.6 | 0.6 | 0.6 | 0.6 | 0.6 | 0.6 |
| LATERAL GROOVES LOCATED IN CENTER REGION | NARROW GROOVE | CHAMFERED SIPE | CHAMFERED SIPE | CHAMFERED SIPE | CHAMFERED SIPE | CHAMFERED SIPE | CHAMFERED SIPE |
| RELATIONSHIP, FOR CHAMFERED SIPES LOCATED IN CENTER REGION, BETWEEN DEPTH OF CHAMFERED PORTION AND DEPTH OF SIPE PORTION: Dc1/Dc2 | - | 0.1 | 0.6 | 0.25 | 0.25 | 0.25 | 0.25 |
| RELATIONSHIP, FOR CHAMFERED SIPES LOCATED IN SHOULDER REGION, BETWEEN DEPTH OF CHAMFERED PORTION AND DEPTH OF SIPE PORTION 2: Dsh1/Dsh2 | - | - | - | - | 0.20 | 0.40 | 0.40 |
| POSITION OF CHAMFERED PORTION IS REVERSED BETWEEN ONE END SIDE AND OTHER END SIDE OF CHAMFERED SIPE | - | No | No | No | No | No | Yes |
| SHOCK BURST RESISTANCE PERFORMANCE | 105 | 106 | 104 | 106 | 107 | 108 | 109 |
| WET BRAKING PERFORMANCE | 101 | 101 | 102 | 101 | 102 | 103 | 103 |

FIG. 14B

PNEUMATIC TIRE

TECHNICAL FIELD

The present technology relates to a pneumatic tire.

BACKGROUND ART

Some known pneumatic tires have specified dimensions at predetermined positions to ensure desired performance. For example, in the pneumatic tire described in Japan Patent No. 5567839, the diameter growth of a tread portion is suppressed, by specifying the ratio between a distance, the distance between the end portion of a belt layer and the outermost edge of a carcass, and a tread width. Additionally, in a run-flat radial tire described in Japan Unexamined Patent Publication No. 2015-205583, rim disengagement is suppressed by specifying the ratio between an overlapping width in the tire axial direction, the overlapping width between a maximum width belt layer and a side reinforcing rubber layer, and a tire cross-sectional height.

Here, wet braking performance, which indicates braking performance on wet road surfaces, is a type of performance required for the pneumatic tire. An example of a method for improving the wet braking performance includes, for example, increasing a groove area corresponding to the opening area of a groove formed in the tread portion to improve water drainage between a ground contact surface of the tread portion and a road surface, thus improving the wet braking performance. However, an excessively increased groove area is likely to reduce the strength of the tread portion, and thus in a case where the ground contact surface treads on a foreign material on the road surface, the foreign material is likely to penetrate the ground contact surface. This leads to difficulty in ensuring shock burst resistance performance against a shock burst occurring in a case where the foreign material is stepped on. Thus, it has been very difficult to ensure shock burst resistance performance while maintaining wet braking performance.

SUMMARY

The present technology provides a pneumatic tire that can provide both wet braking performance and shock burst resistance performance in a compatible manner.

A pneumatic tire according to an embodiment of the present technology includes: at least one carcass layer; a belt layer disposed on an outer side in a tire radial direction of a portion of the carcass layer located in a tread portion, a plurality of belts being layered in the belt layer; and a tread rubber layer disposed on an outer side in the tire radial direction of the belt layer in the tread portion, the tread portion being provided with main grooves extending in a tire circumferential direction and lateral grooves extending in a tire width direction, a plurality of land portions being defined by the main grooves, for the tread portion, in a case where a center region is a region in which a center land portion corresponding to the land portion of the plurality of land portions closest to a tire equatorial plane is located, shoulder regions are each a region between a position corresponding to 85% of a width in the tire width direction of a widest belt corresponding to the belt, the belt being widest in the width in the tire width direction and included in the plurality of the belts of the belt layer, and an end portion of the widest belt in the tire width direction, an average lateral groove width Lc of the center region is a value obtained by dividing groove area of the lateral grooves located in the center region by a circumferential length of the center region, and an average lateral groove width Lsh of the shoulder region is a value obtained by dividing groove area of the lateral grooves located in the shoulder region by a circumferential length of the shoulder region, a relationship between a tire average thickness Gc in the center region and a tire average thickness Gsh in the shoulder region being within a range of $1.05 \leq (Gc/Gsh) \leq 1.35$, a relationship between the average lateral groove width Lc of the center region and the tire average thickness Gc in the center region being within a range of $0.07 \leq (Lc/Gc) \leq 0.12$, and a relationship between the average lateral groove width Lsh of the shoulder region and the tire average thickness Gsh in the shoulder region being within a range of $0.17 \leq (Lsh/Gsh) \leq 0.26$.

In the pneumatic tire described above, preferably, for the lateral grooves located in the center region, in a case where a pitch of the lateral grooves is a distance in the tire circumferential direction between the lateral grooves adjacent in the tire circumferential direction, a ratio between the pitches adjacent in the tire circumferential direction is preferably within a range of 0.7 times or greater and 1.3 times or less.

In the pneumatic tire described above, preferably, for the lateral grooves located in the center region, a length WL in the tire width direction with respect to a width Wc of the center land portion in the tire width direction is within a range of $0.4 \leq (WL/Wc) \leq 0.7$.

In the pneumatic tire described above, preferably, the lateral grooves located in the center region are chamfered sipes each including a chamfer formed at an opening portion opening to a ground contact surface of the tread portion, and the chamfered sipe includes: a chamfered portion formed at the opening portion; and a sipe portion formed between the chamfered portion and a sipe bottom.

In the pneumatic tire described above, preferably, for the chamfered sipes located in the center region, a relationship between a depth Dc1 of the chamfered portion in a sipe depth direction and a depth Dc2 of the sipe portion in the sipe depth direction is within a range of $0.2 \leq (Dc1/Dc2) \leq 0.5$.

In the pneumatic tire described above, preferably, the lateral grooves located in the shoulder regions are the chamfered sipes, and a ratio, for the chamfered sipes located in the center region, of the depth Dc1 of the chamfered portion in the sipe depth direction to the depth Dc2 of the sipe portion in the sipe depth direction (Dc1/Dc2) is smaller than a ratio, for the chamfered sipes located in the shoulder region, of a depth Dsh1 of the chamfered portion in the sipe depth direction to a depth Dsh2 of the sipe portion in the sipe depth direction (Dsh1/Dsh2).

In the pneumatic tire described above, preferably, the chamfered portion of each of the chamfered sipes located in the center region includes a portion formed on only one side of an edge of the opening portion in a sipe width direction.

In the pneumatic tire described above, preferably, for the chamfered sipes located in the center region, the edge at which the chamfered portion is formed differs between one end side and an other end side of the chamfered sipe in an extension direction.

The pneumatic tire according to an embodiment of the present technology can achieve the effect of providing both wet braking performance and shock burst resistance performance in a compatible manner.

BRIEF DESCRIPTION OF DRAWINGS

FIG. 14A is a table showing the results of performance evaluation tests of pneumatic tires.

FIG. 14B is a table showing the results of performance evaluation tests of pneumatic tires.

DETAILED DESCRIPTION

Pneumatic tires according to embodiments of the present technology are described in detail below with reference to the drawings. However, the present technology is not limited by the embodiment. Constituents of the following embodiments include elements that are essentially identical or that can be substituted or easily conceived by one skilled in the art.

First Embodiment

Herein, "tire radial direction" refers to the direction orthogonal to the tire rotation axis (not illustrated) which is the rotation axis of a pneumatic tire 1. "Inner side in the tire radial direction" refers to a side toward the tire rotation axis in the tire radial direction. "Outer side in the tire radial direction" refers to a side away from the tire rotation axis in the tire radial direction. "Tire circumferential direction" refers to the circumferential direction with the tire rotation axis as the center axis. Additionally, "tire width direction" refers to a direction parallel with the tire rotation axis. "Inner side in the tire width direction" refers to a side toward a tire equatorial plane (tire equator line) CL in the tire width direction. "Outer side in the tire width direction" refers to a side away from the tire equatorial plane CL in the tire width direction. "Tire equatorial plane CL" refers to a plane that is orthogonal to the tire rotation axis and that passes through the center of the tire width of the pneumatic tire 1. The tire equatorial plane CL aligns, in a position in the tire width direction, with the center line in the tire width direction corresponding to the center position of the pneumatic tire 1 in the tire width direction. "Tire width" is the width in the tire width direction between portions located on the outermost side in the tire width direction, or in other words, the distance between the portions that are the most distant from the tire equatorial plane CL in the tire width direction. "Tire equator line" refers to the line along the tire circumferential direction of the pneumatic tire 1 that lies on the tire equatorial plane CL. In the description below, "tire meridian cross-section" refers to a cross-section of the tire taken along a plane that includes the tire rotation axis.

Figure 1:
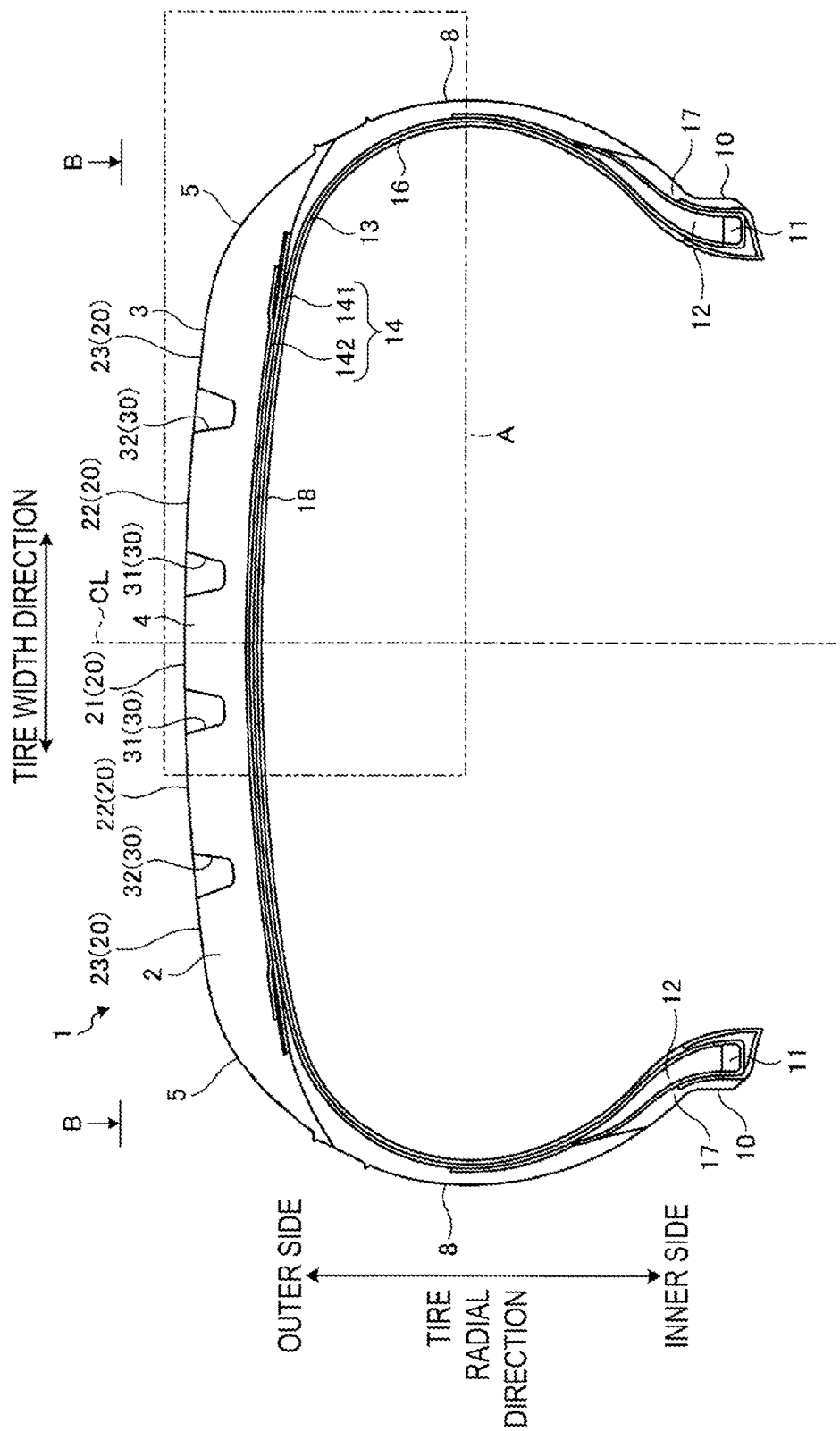
FIG. 1 is a meridian cross-sectional view illustrating a main portion of a pneumatic tire according to an embodiment.

FIG. 1 is a meridian cross-sectional view illustrating a main portion of the pneumatic tire 1 according to an embodiment. In the pneumatic tire 1 according to the first embodiment, as viewed in a tire meridian cross-section, a tread portion 2 is disposed at the portion on the outermost side in the tire radial direction. The tread portion 2 includes a tread rubber layer 4 formed from a rubber composition. Additionally, the surface of the tread portion 2, which is a portion that comes into contact with a road surface in a case where a vehicle (not illustrated) mounted with the pneumatic tire 1 is traveling, is formed as a ground contact surface 3. The ground contact surface 3 forms a part of the contour of the pneumatic tire 1. The tread portion 2 includes the ground contact surface 3 provided with a plurality of main grooves 30 extending in the tire circumferential direction, and by the plurality of main grooves 30, a plurality of land portions 20 are defined on a surface of the tread portion 2. In the first embodiment, four main grooves 30 are formed side by side in the tire width direction, and for the four main grooves 30, two main grooves 30 each are disposed on both sides of the tire equatorial plane CL in the tire width direction. In other words, the tread portion 2 is provided with a total of the four main grooves 30 including: two center main grooves 31 each disposed on both sides of the tire equatorial plane CL; and two shoulder main grooves 32 each disposed on the outer side of the corresponding one of the two center main grooves 31 in the tire width direction.

Note that "main groove 30" refers to a longitudinal groove in which at least a part thereof extends in the tire circumferential direction. Generally, the main groove 30 has a groove width of 3 mm or greater and a groove depth of 6 mm or greater, and internally includes a tread wear indicator (slip sign) that indicates the terminal stage of wear. In the first embodiment, the main groove 30 has: a groove width of 9 mm or greater and 12 mm or less; and a groove depth of 7 mm or greater and 8 mm or less and is substantially parallel with the tire equator line (center line) where the tire equatorial plane CL intersects the ground contact surface 3. The main grooves 30 may extend linearly in the tire circumferential direction or may be provided in a wave-like shape or a zigzag shape.

Of the land portions 20 defined by the main grooves 30, the land portion 20 located between the two center main grooves 31 and located on the tire equatorial plane CL is a center land portion 21. Additionally, each of the land portions 20 located between the center main groove 31 and the shoulder main grooves 32 adjacent to each other and disposed on the outer side of the center land portion 21 in the tire width direction is a second land portion 22. Additionally, each of the land portions 20 located on the outer side of the second land portion 22 in the tire width direction and adjacent to the second land portion 22 via the shoulder main groove 32 is a shoulder land portion 23.

Additionally, a shoulder portion 5 is located at both outer ends of the tread portion 2 in the tire width direction, and a sidewall portion 8 is disposed on an inner side of the shoulder portion 5 in the tire radial direction. In other words, the sidewall portion 8 is disposed on both sides of the tread portion 2 in the tire width direction. In other words, the sidewall portion 8 is disposed at two locations on both sides of the pneumatic tire 1 in the tire width direction and forms an exposed portion on the outermost side in the tire width direction of the pneumatic tire 1.

A bead portion 10 is located on an inner side in the tire radial direction of each of the sidewall portions 8 located on both sides in the tire width direction. Similarly to the sidewall portion 8, the bead portion 10 is disposed at two locations on both sides of the tire equatorial plane CL, that is, a pair of bead portions 10 are disposed on both sides of the tire equatorial plane CL in the tire width direction. Each of the bead portions 10 is provided with a bead core 11, and a bead filler 12 is provided on the outer side of the bead core 11 in the tire radial direction. The bead core 11 is an annular member formed in an annular shape by bundling bead wires including steel wires, and the bead filler 12 is a rubber member disposed on the outer side of the bead core 11 in the tire radial direction.

A belt layer 14 is provided on the inner side of the tread portion 2 in the tire radial direction. the belt layer 14 has a multilayer structure in which a plurality of belts 141 and 142 are layered, and in the first embodiment, two layers of the belts 141 and 142 are layered. The belts 141 and 142 constituting the belt layer 14 are formed by covering, with coating rubber, a plurality of belt cords including steel or an organic fiber material such as polyester, rayon, or nylon and by performing a rolling process on the coating rubber-covered belt cords. In addition, the two layers of belts 141 and 142 have different belt angles, the belt angle being defined as the inclination angle of the belt cord with respect to the tire circumferential direction. Thus, the belt layer 14 is configured as a so-called cross-ply structure in which the two layers of belts 141 and 142 are layered with the inclination directions of the belt cords intersecting each other. In other words, the two layers of belts 141 and 142 are provided as so-called cross belts in which the belt cords of belts 141 and 142 are each disposed in an orientation intersecting each other. The tread rubber layer 4 of the tread portion 2 is disposed on the outer side of the belt layer 14 in the tire radial direction in the tread portion 2.

On the inner side of the belt layer 14 in the tire radial direction and on a side of the tire equatorial plane CL closer to the sidewall portion 8, a carcass layer 13 containing the cords of radial plies is continuously provided. Thus, the pneumatic tire 1 according to the first embodiment is configured as a so-called radial tire. The carcass layer 13 has a single layer structure including one carcass ply or a multilayer structure including a plurality of carcass plies and spans between the pair of bead portions 10 on both sides in the tire width direction in a toroidal shape to form a framework of the tire. In other words, at least one layer of the carcass layer 13 is disposed between the pair of bead portions 10.

Specifically, the carcass layer 13 is disposed from one bead portion 10 of the pair of bead portions 10 located on both sides in the tire width direction to the other bead portion 10 and is turned back outward in the tire width direction along the bead cores 11 at the bead portions 10, wrapping around the bead cores 11 and the bead fillers 12. The bead filler 12 is a rubber material disposed in a space formed on the outer side of the bead core 11 in the tire radial direction by the carcass layer 13 being folded over the bead portion 10. Additionally, the belt layer 14 is disposed on the outer side in the tire radial direction of a portion of the carcass layer 13 located in the tread portion 2, the carcass layer 13 spanning between the pair of bead portions 10. Additionally, carcass plies of the carcass layer 13 are formed by covering, with coating rubber, a plurality of carcass cords including steel or an organic fiber material such as aramid, nylon, polyester, rayon, and the like and by performing a rolling process on the coating rubber-covered carcass cords. A plurality of carcass cords constituting the carcass plies are disposed side by side with a certain angle with respect to the tire circumferential direction, the angle with respect to the tire circumferential direction being along the tire meridian direction.

A rim cushion rubber 17 is disposed at the bead portion 10 on the inner side in the tire radial direction and the outer side in the tire width direction of the bead core 11 and the turned back portion of the carcass layer 13. The rim cushion rubber 17 is the contact surface of the bead portion 10 against the rim flange. Additionally, an innerliner 16 is formed along the carcass layer 13 on the inner side of the carcass layer 13 or on a side of the carcass layer 13 corresponding to the inside of the pneumatic tire 1. The innerliner 16 forms a tire inner surface 18 corresponding to the inner surface of the pneumatic tire 1.

Figure 2:
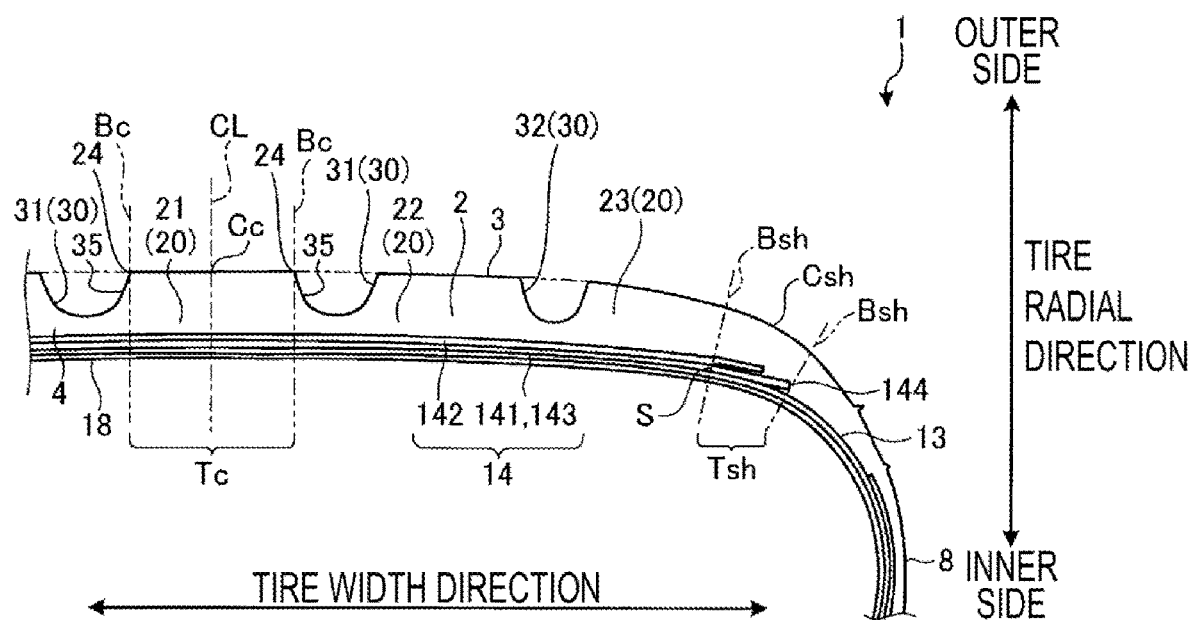
FIG. 2 is a detailed view of a portion A of FIG. 1.

FIG. 2 is a detailed view of the portion A of FIG. 1. In the tread portion, assuming that a center region Tc is a region located in the center in the tire width direction and that a shoulder region Tsh is a region located at both ends in the tire width direction, a predetermined relative relationship in tire average thickness is satisfied between the regions. Among these regions, the center region Tc is a region where, of the plurality of land portions 20, the center land portion 21 corresponding to the land portion 20 closest to the tire equatorial plane CL, is located. Specifically, in the tire meridian cross-section, assuming that a center region boundary line Bc extends perpendicularly to the tire inner surface 18, from an intersection point 24 between a portion of a groove wall 35 of each of the center main grooves 31 defining the center land portion 21, the portion being located on the center land portion 21 side, and the ground contact surface 3 indicating an outer contour line on the outer side of the center land portion 21 in the tire radial direction, the center region Tc is a region located between two center region boundary lines Bc located on both sides of the center land portion 21 in the tire width direction. In the first embodiment, the center region Tc is located on the tire equatorial plane CL, and the center position of the center region Tc in the tire width direction and the tire equatorial plane CL are located at substantially an identical position in the tire width direction.

Note that, in a case where the center main groove 31 has an amplitude in the tire width direction by bending or curving in the tire width direction while extending in the tire circumferential direction, the center region Tc is defined within the widest range in the tire width direction. In other words, in a case where the center main groove 31 has an amplitude in the tire width direction, each of the center region boundary lines Bc defining the center region Tc extends perpendicularly to a tire inner surface 18, from the intersection point 24 between a portion of the groove wall 35 of each of the center main grooves 31 defining the center land portion 21, the portion being located on the outermost side in the tire width direction on the tire circumferential direction, and the ground contact surface 3.

Additionally, the shoulder region Tsh is a region between a position S corresponding to 85% of the width of the belt layer 14 in the tire width direction and an end portion 144 of the belt layer 14 in the tire width direction. Specifically, in a tire meridian cross-section, assuming that shoulder region boundary lines Bsh extend perpendicularly to the tire inner surface 18 respectively from the position S corresponding to 85% of the width of a widest belt 143, the widest belt 143 corresponding to one of the plurality of belts 141 and 142 of the belt layer 14 and being widest in the tire width direction, and from the end portion 144 of the widest belt 143, the shoulder region Tsh is a region located between the two shoulder region boundary lines Bsh. The shoulder region Tsh defined as described above is defined on both sides of the tire equatorial plane CL in the tire width direction and is located on both sides of the tire equatorial plane CL in the tire width direction.

In the first embodiment, of the two layers of belts 141 and 142 included in the belt layer 14, the width of the belt 141 in the tire width direction located on the inner side in tire radial direction is wider than the width of the other belt 142 in the tire width direction, and the belt 141 located on the inner side in the tire radial direction corresponds to the widest belt 143.

Additionally, the position S corresponding to 85% of the width of the widest belt 143 in the tire width direction is located at an end portion of a region corresponding to 85%, in a case where the region corresponding to 85% of the width of the widest belt 143 is evenly distributed on both sides in the tire width direction, around the center of the widest belt 143 in the tire width direction or the position of the tire equatorial plane CL as the center. Thus, the distance between the position S corresponding to 85% of the width of the widest belt 143 in the tire width direction and the end portion 144 of the widest belt 143 has the same magnitude on both sides in the tire width direction of the tire equatorial plane CL.

The center region Tc and the shoulder region Tsh are defined in shapes obtained in a state in which the pneumatic tire 1 is mounted on a regular rim and inflated to the regular internal pressure. Here, "regular rim" refers to a "standard rim" defined by the JATMA (The Japan Automobile Tyre Manufacturers Association, Inc.), a "Design Rim" defined by the TRA (The Tire and Rim Association, Inc.), or a "Measuring Rim" defined by the ETRTO (The European Tyre and Rim Technical Organisation). Also, "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

The tire average thickness in each of the center region Tc and the shoulder region Tsh defined as described above is the average value of the tire thickness for each region in the tire meridian cross-section, from the ground contact surface 3, indicating the outer contour line corresponding to the contour line on the outer side of the land portion 20 in the tire radial direction, to the tire inner surface 18. In other words, a tire average thickness Gc in the center region Tc is the average value of the distance from the ground contact surface 3 to the tire inner surface 18 in the center region Tc, and a tire average thickness Gsh in the shoulder region Tsh is the average value of the distance from the ground contact surface 3 to the tire inner surface 18 in the shoulder region Tsh.

The tire average thickness Gc of the center region Tc and the tire average thickness Gsh of the shoulder region Tsh may be calculated by dividing the cross-sectional area of each of the center region Tc and the shoulder region Tsh, of the tread portion 2 in the tire meridian cross-section, by the width of each of the regions. For example, the tire average thickness Gc of the center region Tc may be calculated by dividing the cross-sectional area of the center region Tc by the distance between the two center region boundary lines Bc defining the center region Tc. In a case where the two center region boundary lines Bc are inclined with respect to each other, the tire average thickness Gc of the center region Tc is calculated by dividing the cross-sectional area of the center region Tc by the distance of intermediate positions between the position of the ground contact surface 3 on the center region boundary line Bc and the position of the tire inner surface 18 on the center region boundary line Bc. The tire average thickness Gsh of the shoulder region Tsh may also be calculated by dividing the cross-sectional area of the shoulder region Tsh by the distance between the shoulder region boundary lines Bsh defining the shoulder region Tsh.

In the tread portion 2, a relationship between the tire average thickness Gc in the center region Tc calculated as described above and the tire average thickness Gsh in the shoulder region Tsh as described above is within the range of $1.05 \leq (Gc/Gsh) \leq 1.35$. Note that the relationship between the tire average thickness Gc of the center region Tc and the tire average thickness Gsh of the shoulder region Tsh is preferably within the range of $1.08 \leq (Gc/Gsh) \leq 1.20$.

For the tread portion 2, not only the tire average thickness but also the actual rubber thickness, which is the thickness of the tread rubber layer 4 determined taking the grooves formed in the tread portion 2 into account, satisfies a predetermined relative relationship. In other words, for the average actual rubber thickness, corresponding to the actual rubber thickness calculated for each of the center region Tc and the shoulder region Tc, the average actual rubber thickness of the center region Tc and the average actual rubber thickness of the shoulder region Tsh satisfy a predetermined relative relationship. In the tread portion 2, the main grooves 30 are formed, and besides the main grooves 30 extending in the tire circumferential direction, grooves such as lateral grooves 40 (see FIG. 3) extending in the tire width direction are formed. The average actual rubber thickness of the tread rubber layer 4 is the thickness of the tread rubber layer 4 calculated on the assumption that the rubber forming the tread rubber layer 4 is not present in the groove portions. Thus, the average actual rubber thickness of the tread rubber layer 4 in each of the regions is calculated by dividing the actual volume of the tread rubber layer 4 in each of the regions not including the grooves such as the main grooves 30 and the lateral grooves 40 by the area of the tire inner surface 18 located in each of the regions.

For example, an average actual rubber thickness Vc of the tread rubber layer 4 in the center region Tc is calculated by dividing the volume of the tread rubber layer 4 in the center region Tc not including grooves by the area of the tire inner surface 18 located in the center region Tc. The area of the tire inner surface 18 located in the center region Tc corresponds to the area of a portion of the tire inner surface 18 that is sandwiched between the two center region boundary lines Bc defining the center region Tc and that extends in the tire circumferential direction.

Additionally, an average actual rubber thickness Vsh of the tread rubber layer 4 in the shoulder region Tsh is calculated by dividing the volume of the tread rubber layer 4 in the shoulder region Tsh not including the grooves such as the lateral grooves 40 by the area of the tire inner surface 18 located in the shoulder region Tsh. The area of the tire inner surface 18 located in the shoulder region Tsh corresponds to the area of a portion of the tire inner surface 18 that is sandwiched between the two shoulder region boundary lines Bsh defining the shoulder region Tsh and that extends in the tire circumferential direction.

For the tread portion 2, a relationship between the average actual rubber thickness Vc of the tread rubber layer 4 in the center region Tc calculated as described above and the average actual rubber thickness Vsh of the tread rubber layer 4 in the shoulder region Tsh as described above is within the range of $1.6 \leq (Vc/Vsh) \leq 2.5$.

Note that the average actual rubber thickness of the tread rubber layer 4 in each of the regions may be calculated by cutting out the tread rubber layer 4 from each region of the pneumatic tire 1, calculating the volume based on the mass of the cut-out tread rubber layer 4 and the specific gravity of the rubber constituting the tread rubber layer 4, and dividing the calculated volume by the area of the tire inner surface 18 located in each of the regions.

In addition, a portion of the rubber forming the tread rubber layer 4, the portion of the rubber being included at least in the center region Tc, has a modulus at 300% elongation in a range of 10 MPa or higher and 16 MPa or lower. The modulus at 300% elongation is measured in a tensile test at 23° C. in conformance with JIS (Japanese Industrial Standard) K6251 (using a dumbbell No. 3) and indicates tensile stress at 300% elongation. Additionally, for the rubber forming the tread rubber layer 4, the rubber being located in the regions other than the center region Tc, may also have a modulus at 300% elongation of 10 MPa or higher and 16 MPa or lower.

Figure 3:
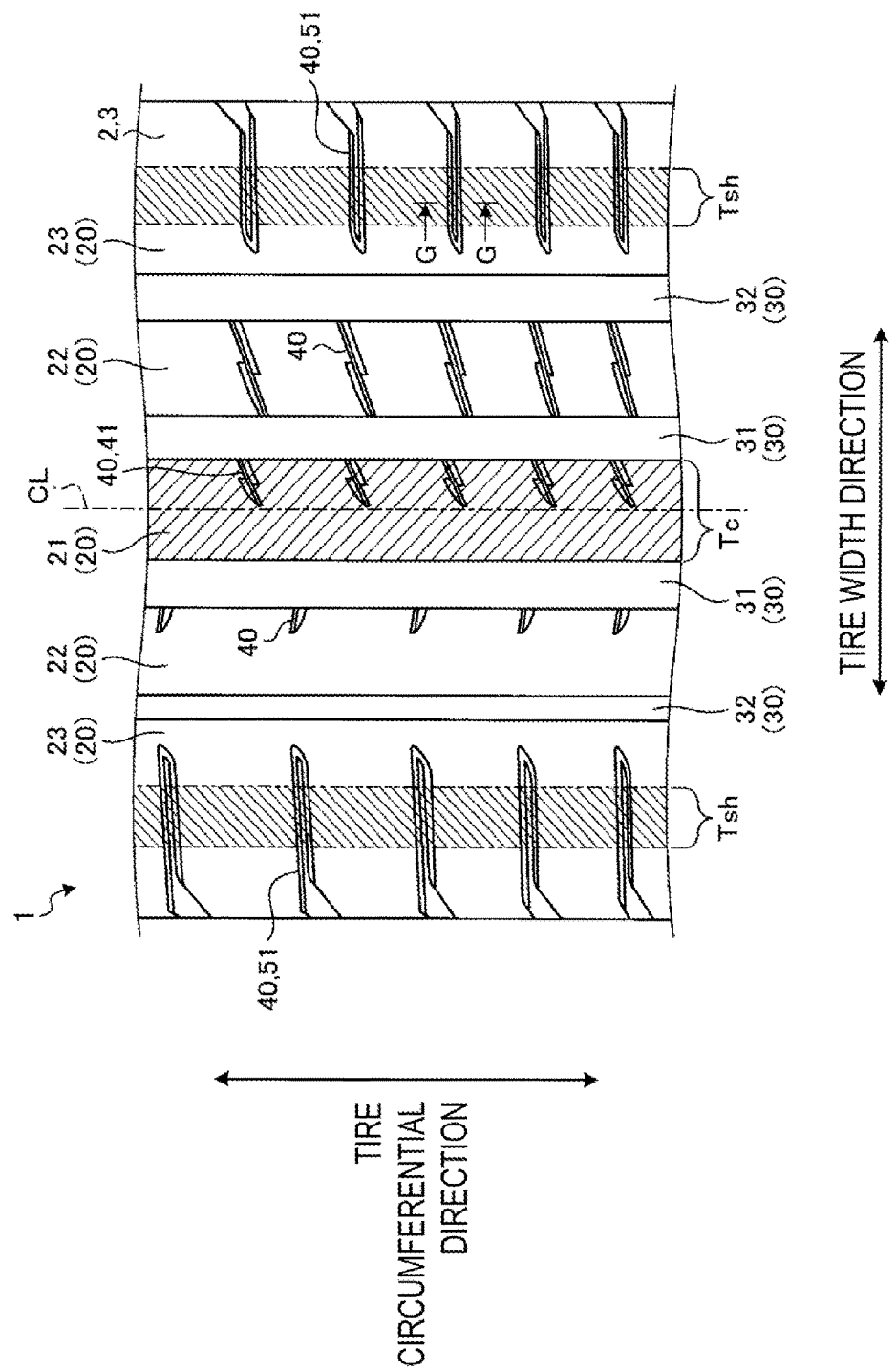
FIG. 3 is a view taken along an arrow B-B in FIG. 1.

FIG. 3 is a view taken along the line B-B in FIG. 1. In addition to the main grooves 30, the plurality of lateral grooves 40 extending in the tire width direction are formed in the tread portion 2. The plurality of lateral grooves 40 are disposed side by side in the tire circumferential direction in each of the center land portion 21, the second land portion 22, and the shoulder land portion 23. In the pneumatic tire 1 according to the first embodiment, the lateral grooves 40 formed in the center land portion 21 include one end opening to the center main groove 31 and the other end terminating in the center land portion 21. Additionally, the lateral grooves 40 formed in the second land portion 22 of the two second land portions 22 include one end opening to the center main groove 31 and the other end terminating in the second land portion 22. Additionally, the lateral grooves 40 formed in the other second land portion 22 of the two second land portions 22 include one end opening to the center main groove 31 and the other end opening to the shoulder main groove 32. Additionally, the lateral grooves 40 formed in the shoulder land portion 23 include one end terminating in the shoulder land portion 23 and the other end opening at an end portion in the tire width direction of the ground contact surface 3 of the tread portion 2.

As described above, in the tread portion 2 in which the plurality of lateral grooves 40 are formed, the size of the groove area of the lateral grooves 40 with respect to the tire average thickness differs between the center region Tc and the shoulder region Tsh. Specifically, assuming that an average lateral groove width Lc of the center region Tc is a value obtained by dividing the groove area of the lateral grooves 40 located in the center region Tc by the circumferential length of the center region Tc, the relationship between the average lateral groove width Lc of the center region Tc and the tire average thickness Gc in the center region Tc is within the range of $0.07 \leq (Lc/Gc) \leq 0.12$. Additionally, assuming that an average lateral groove width Lsh of the shoulder region Tsh is a value obtained by dividing the groove area of the lateral grooves 40 located in the shoulder region Tsh by the circumferential length of the shoulder region Tsh, the relationship between the average lateral groove width Lsh of the shoulder region Tsh and the tire average thickness Gsh in the shoulder region Tsh is within the range of $0.17 \leq (Lsh/Gsh) \leq 0.26$.

As described above, the center region Tc and the shoulder region Tsh differ from each other in terms of the ratio of the average lateral groove width to the tire average thickness. In other words, for the center region Tc and the shoulder region Tsh, the average lateral groove width Lc in the center region Tc with respect to the tire average thickness Gc of the center region Tc (Lc/Gc) is larger than the average lateral groove width Lsh in the shoulder region Tsh with respect to the tire average thickness Gsh of the shoulder region Tsh (Lsh/Gsh).

In this case, the groove area of the lateral grooves 40 is the area on the ground contact surface 3 of the tread portion 2, that is, the opening area of the lateral grooves 40.

Additionally, the circumferential length of the center region Tc corresponds to the length in the tire circumferential direction of the ground contact surface 3 located in the center region Tc at a center position Cc as viewed in a tire meridian cross-section. Specifically, the circumferential length of the center region Tc is the length in the tire circumferential direction of the center position Cc of the portion located in the center region Tc in the extension direction of the ground contact surface 3 of the tread portion 2 in a tire meridian cross-section. In the first embodiment, the center position of the center region Tc in the tire width direction aligns with the tire equatorial plane CL. Thus, the circumferential length of the center region Tc corresponds to the length in the tire circumferential direction at the position Cc where the ground contact surface 3 located in the center region Tc intersects the tire equatorial plane CL.

Additionally, the circumferential length of the shoulder region Tsh corresponds to the length of the ground contact surface 3 located in the shoulder region Tsh in the tire circumferential direction at a center position Csh as viewed in a tire meridian cross-section. That is, the circumferential length of the shoulder region Tsh is the length in the tire circumferential direction of the center position Csh of the portion located in the shoulder region Tsh in the extension direction of the ground contact surface 3 of the tread portion 2 in a tire meridian cross-section.

Figure 4:
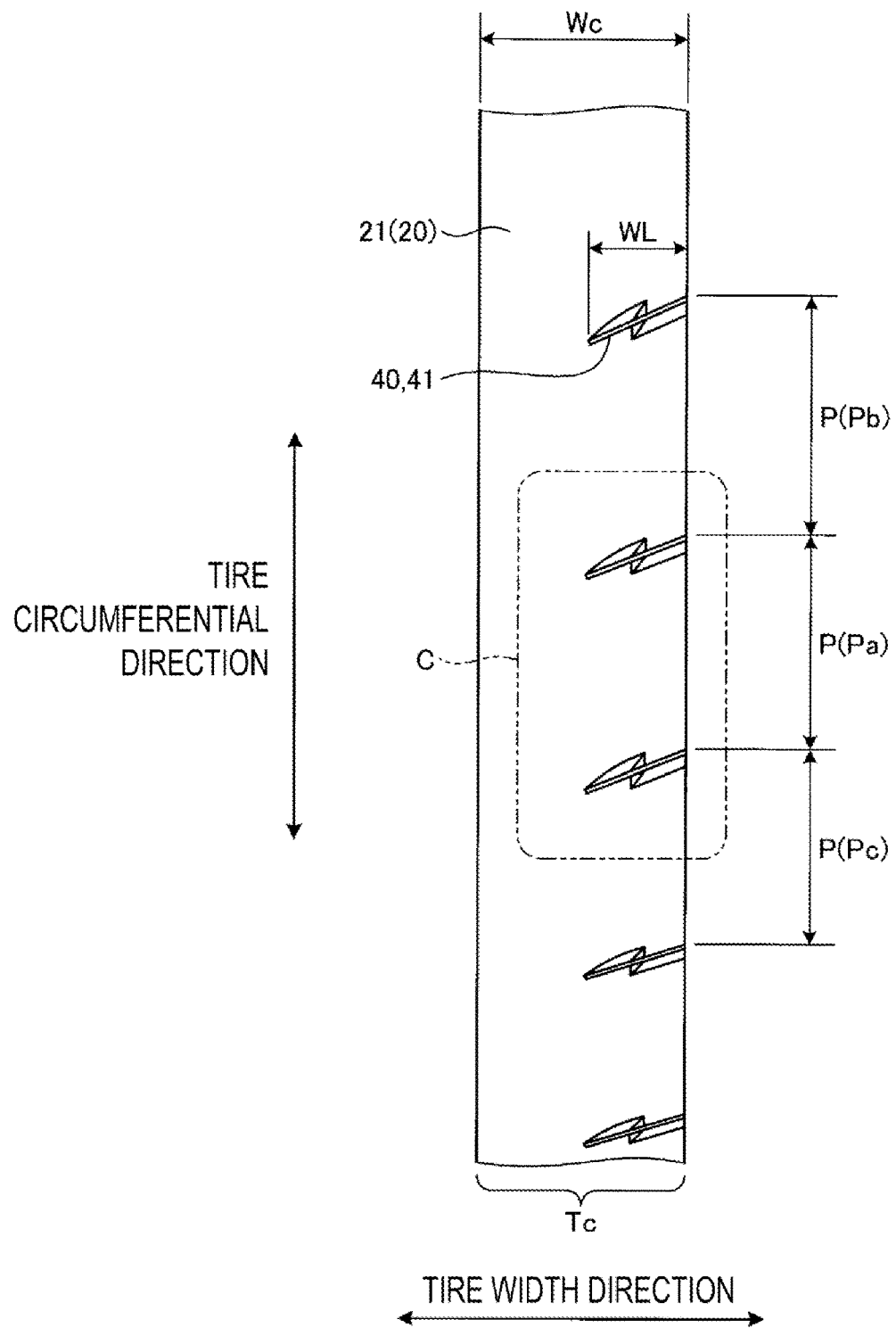
FIG. 4 is a detailed view of a center land portion illustrated in FIG. 3.

FIG. 4 is a detailed view of the center land portion 21 illustrated in FIG. 3. In the center region Tc, the plurality of lateral grooves 40 are disposed side by side in the tire circumferential direction, and for the lateral grooves 40 disposed in the center region Tc, the distance in the tire circumferential direction between the lateral grooves 40 adjacent in the tire circumferential direction is within a predetermined range. Specifically, assuming that a pitch P of the lateral grooves 40 is the distance in the tire circumferential direction between the lateral grooves 40 adjacent in the tire circumferential direction, for the lateral grooves 40 located in the center region Tc, the ratio between the pitches P adjacent in the tire circumferential direction is within the range of 0.7 times or greater and 1.3 times or less. In other words, among the plurality of lateral grooves 40 disposed in the center region Tc, the size of a pitch Pa of the two lateral grooves 40 adjacent in the tire circumferential direction is in a range of from 0.7 times or greater and 1.3 times or less, with respect to a pitch Pb adjacent to the pitch Pa on one side in the tire circumferential direction and a pitch Pc adjacent to the pitch Pa on the other side in the tire circumferential direction.

Additionally, for all of the plurality of lateral grooves 40 located in the center region Tc, a length WL of the lateral groove 40 in the tire width direction with respect to a width Wc of the center land portion 21 in the tire width direction is within the range of $0.4 \leq (WL/Wc) \leq 0.7$. In this case, the width Wc of the center land portion 21 in the tire width direction corresponds to the width of the ground contact surface 3 of the center land portion 21 in the tire width direction. Note that the length WL in the tire width direction of each of the lateral grooves 40 located in the center region Tc with respect to the width Wc of the center land portion 21 in the tire width direction is preferably within the range of $0.5 \leq (WL/Wc) \leq 0.65$.

Figure 5:
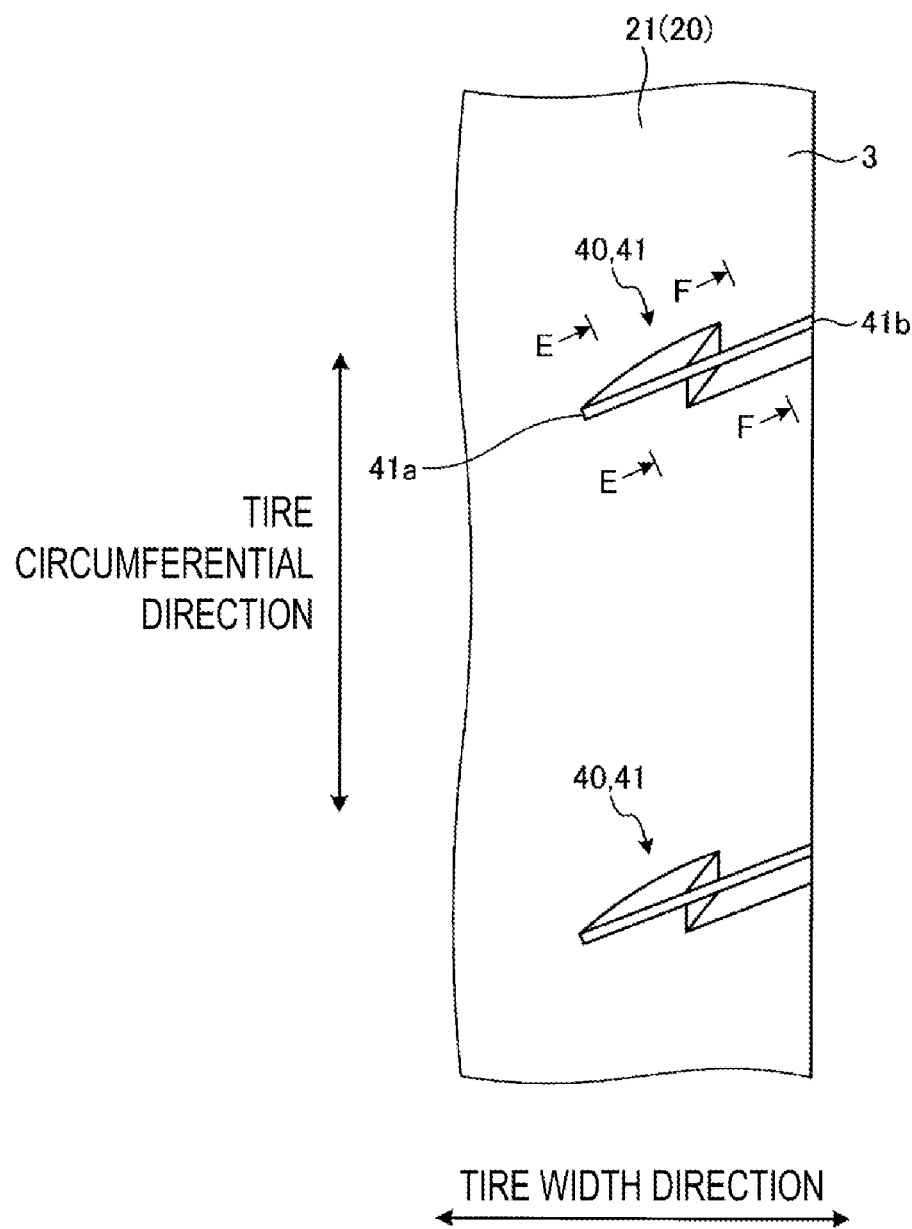
FIG. 5 is a detailed view of a portion C of FIG. 4.
Figure 6:
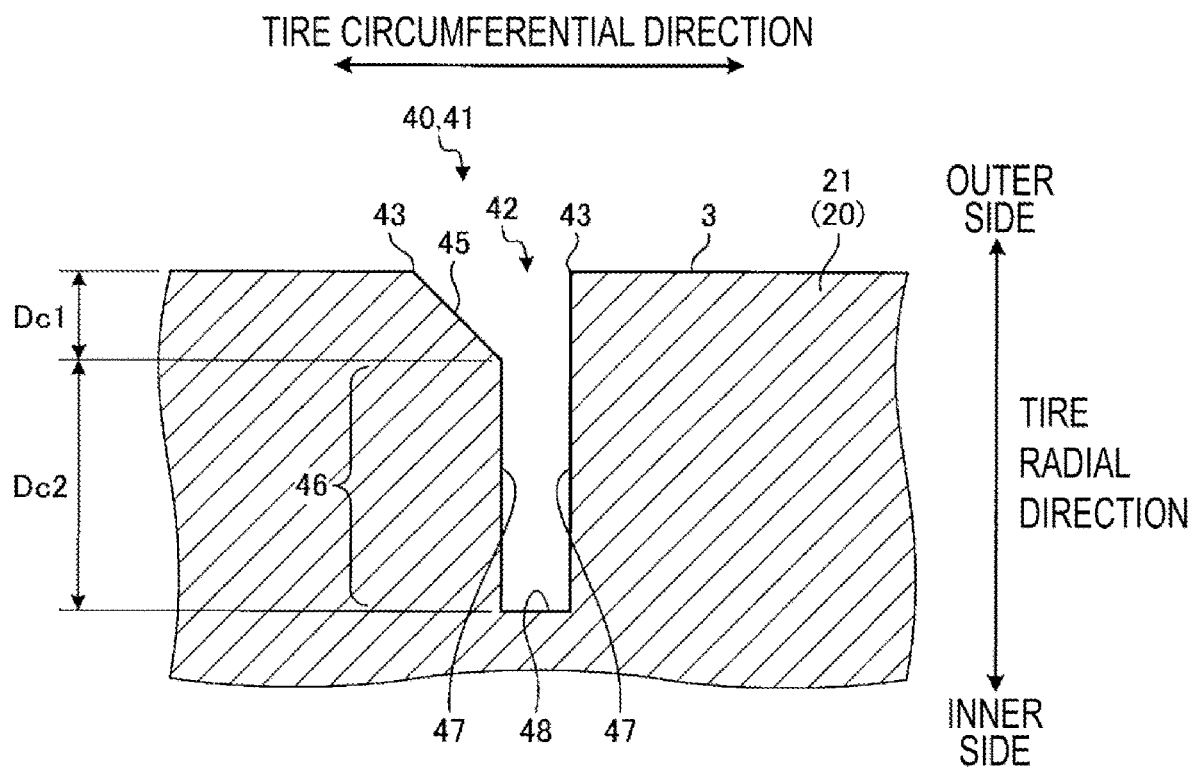
FIG. 6 is a cross-sectional view taken along a line E-E in FIG. 5.

FIG. 5 is a detailed view of the portion C of FIG. 4. FIG. 6 is a cross-sectional view taken along the line E-E in FIG. 5. Each of the lateral grooves 40 located in the center region Tc forms a chamfered sipe 41 including a chamfer formed at an opening 42 opening into the ground contact surface 3 of the tread portion 2. In other words, the plurality of lateral grooves 40 formed in the center land portion 21 all form the chamfered sipes 41. Each of the chamfered sipes 41 formed in the center land portion 21 includes: a chamfered portion 45 formed at the opening 42; and a sipe portion 46 formed between the chamfered portion 45 and a sipe bottom 48. Of these components, the chamfered portion 45 is formed as a surface connecting the ground contact surface 3 and a sipe wall 47. Additionally, at most of the positions of the chamfered sipe 41 in the extension direction, the chamfered portion 45 is formed on only one edge 43 side of both edges 43 of the opening 42 in the sipe width direction. In other words, at most of the positions of the chamfered sipe 41 in the extension direction, the chamfered portion 45 is formed between one sipe wall 47 of the two facing sipe walls 47 of the chamfered sipe 41 and the ground contact surface 3.

Note that each of the sipes in this case forms a narrow groove having a groove width of 0.4 mm or greater and 1.6 mm or less. In other words, the width of the chamfered sipe 41 in the width direction of the sipe portion 46, that is, a sipe width corresponding to the distance between the facing sipe walls 47, is within the range of 0.4 mm or greater and 1.6 mm or less. Additionally, the sipe depth of the chamfered sipe 41, corresponding to a depth from the ground contact surface 3 to the sipe bottom 48, is within the range of 3 mm or greater and 6.5 mm or less.

Additionally, the relationship between a depth Dc1 of the chamfered portion 45 in the sipe depth direction and a depth Dc2 of the sipe portion 46 in the sipe depth direction is within the range of $0.2 \leq (Dc1/Dc2) \leq 0.5$. In this case, the depth Dc1 of the chamfered portion 45 corresponds to a distance in the sipe depth direction from an end portion on the ground contact surface 3 side to an end portion on the sipe bottom 48 side, in the chamfered sipe 45. The depth Dc2 of the sipe portion 46 corresponds to a distance in the sipe depth direction from an end portion in the chamfered sipe 45 on the sipe bottom 48 side to the sipe bottom 48.

Figure 7:
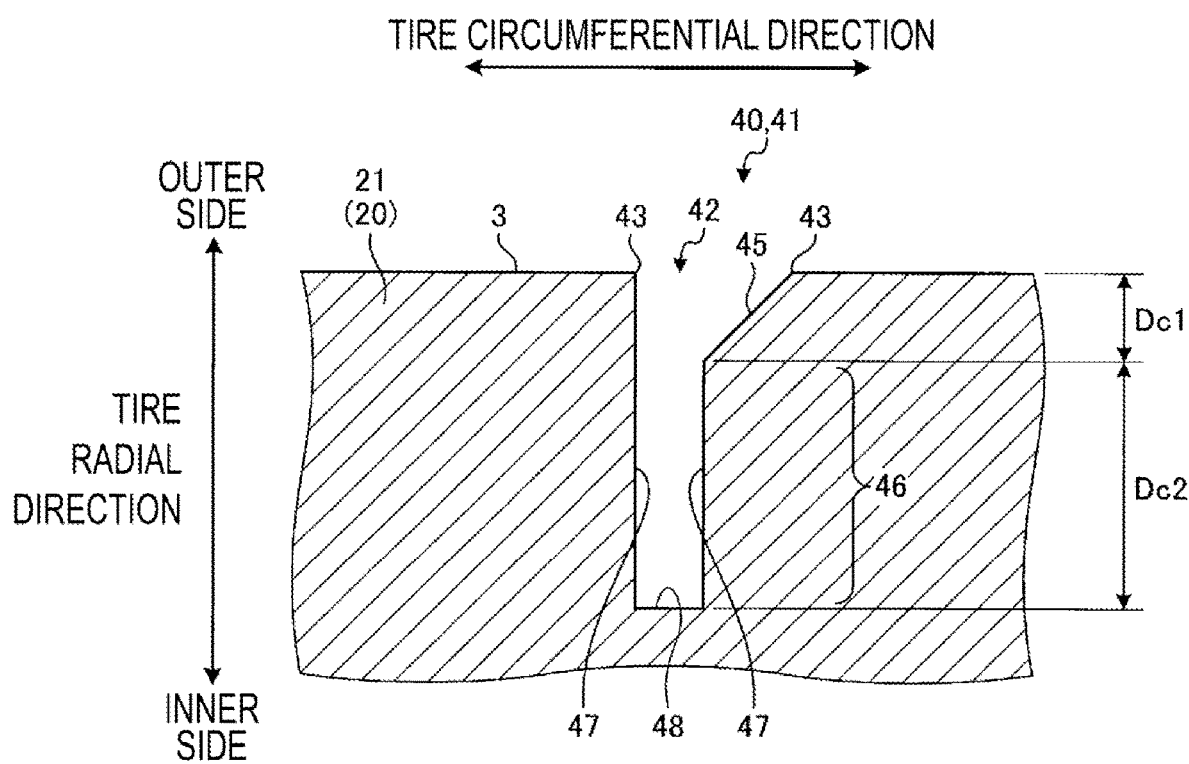
FIG. 7 is a cross-sectional view taken along a line F-F in FIG. 5.

FIG. 7 is a cross-sectional view taken along the line F-F in FIG. 5. For the chamfered sipes 41 located in the center region Tc and formed in the center land portion 21, the edge 43, at which the chamfered portion 45 is formed, differs between one end side and the other end side in the extension direction of the chamfered sipe 41. In other words, the chamfered portion 45 formed in the chamfered sipe 41 is formed in the edges 43 or the sipe walls 47, the edges 43 or the sipe walls 47 differing from each other between the range from an intermediate position in the extension direction of the chamfered sipe 41 to one end portion 41a and the range from the intermediate portion to the other end portion 41b.

Note that the chamfered portion 45 formed on one edge 43 side and the chamfered portion 45 formed on the other edge 43 side may overlap each other in the extension direction of the chamfered sipe 41, or may be spaced apart in the extension direction of the chamfered sipe 41. In other words, it is sufficient that the chamfered portion 45 includes a portion formed on only one edge 43 side of the edges 43 on both sides in the sipe width direction of the opening 42. In other words, it is sufficient that the chamfered portion 45 includes a portion formed only between one sipe wall 47 of the two facing sipe walls 47 of the chamfered sipe 41 and the ground contact surface 3.

Figure 8:
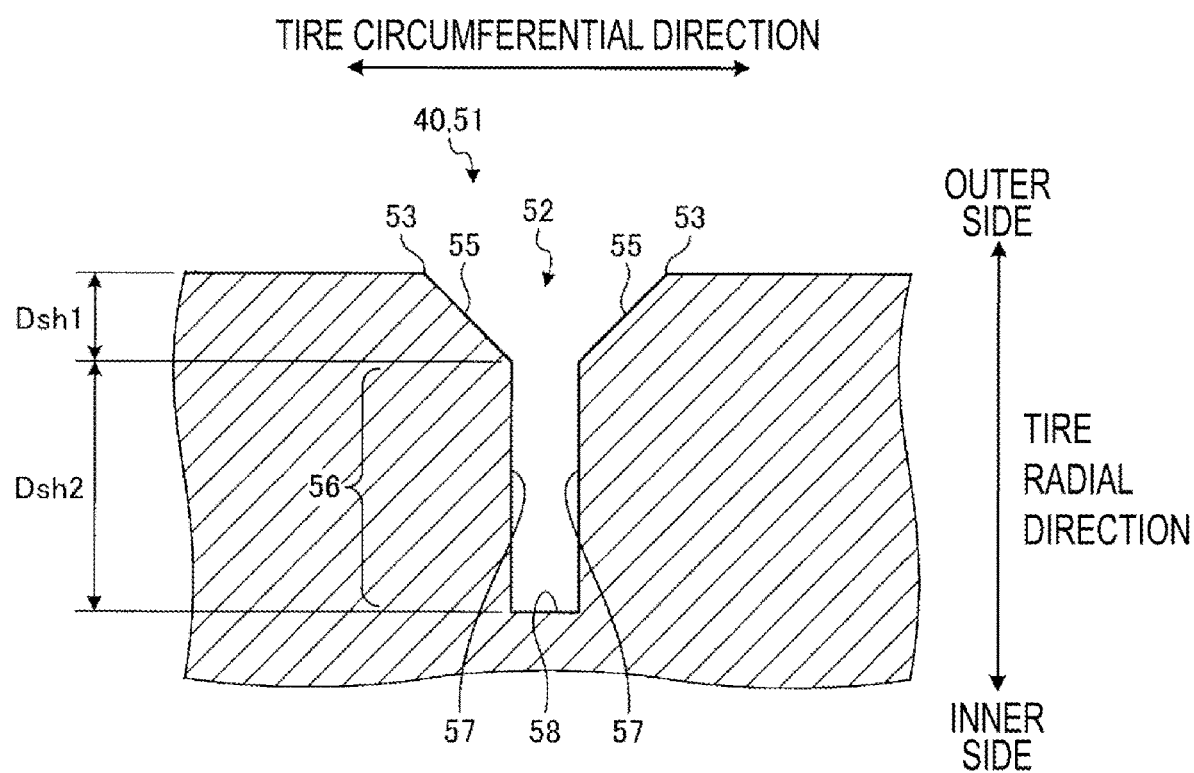
FIG. 8 is a cross-sectional view taken along a line G-G in FIG. 3.

FIG. 8 is a cross-sectional view taken along the G-G in FIG. 3. The lateral grooves 40 located in the shoulder region Tsh, that is, the lateral grooves 40 formed in the shoulder land portion 23, form chamfered sipes 51. Each of the chamfered sipes 51 formed in the shoulder land portion 23 includes: a chamfered portion 55 formed in an opening 52 and connecting the ground contact surface 3 and a sipe wall 57; and a sipe portion 56 formed between the chamfered portion 55 and a sipe bottom 58. Of these components, unlike the chamfered portion 45 of the chamfered sipe 41 formed in the center land portion 21, the chamfered portion 55 is formed on both edges 53 of the opening 52 in the sipe width direction. In other words, the chamfered portions 55 of the chamfered sipes 51 formed in the shoulder land portions 23 are each formed between each of the two facing sipe walls 57 of the chamfered sipe 51 and the ground contact surface 3.

For the chamfered sipes 51 thus formed in the shoulder land portions 23 and located in the shoulder region Tsh, the relationship between a depth Dsh1 of the chamfered portion 55 in the sipe depth direction and a depth Dsh2 of the sipe portion 56 in the sipe depth direction is within the range of $0.3 \leq (Dsh1/Dsh2) \leq 0.6$. Note that, for the chamfered sipes 51 located in the shoulder region Tsh, the depth Dsh1 in the sipe depth direction may vary between the different chamfered portions 55, that is, the depth Dsh2 of the sipe portion 56 in the sipe depth direction may vary between the different sipe walls 57.

The ratio between each of the depth Dc1 of the chamfered portion 45 and Dsh1 and the corresponding one of the depths Dc2 of the sipe portion 46 and Dsh2 differs between the chamfered sipes 41 located in the center region Tc and the chamfered sipes 51 located in the shoulder region Tsh. Specifically, the ratio, for the chamfered sipe 41 located in the center region Tc, of the depth Dc1 of the chamfered portion 45 in the sipe depth direction to the depth Dc2 of the sipe portion 46 in the sipe depth direction (Dc1/Dc2) is smaller than the ratio, for the chamfered sipes 51 located in the shoulder region Tsh, of the depth Dsh1 of the chamfered portion 55 in the sipe depth direction to the depth Dsh2 of the sipe portion 56 in the sipe depth direction (Dsh1/Dsh2). In other words, the ratio of the depth Dc1 of the chamfered portion 45 to the sipe depth is smaller in the chamfered sipes 41 located in the center region Tc than in the chamfered sipes 51 located in the shoulder region Tsh.

Additionally, in the first embodiment, all of the lateral grooves 40 formed in the two second land portions 22 form chamfered sipes. Among the lateral grooves 40 formed in the second land portions 22, the lateral grooves 40 with one end terminating in the second land portion 22 form single-sided chamfered sipes in which a chamfer is formed on only one edge of edges on both sides in the sipe width direction. Additionally, in the lateral grooves 40 formed in the second land portion 22, for the lateral grooves 40 in which both ends thereof open to the main grooves 30, as in the case of the chamfered sipes 41 formed in the center land portion 21, the chamfer is formed into edges differing between the range from the intermediate position in the extension direction of the chamfered sipe to an end portion on one side and the range from the intermediate position to an end portion on the other side.

In a case where the pneumatic tire 1 according to the first embodiment is mounted on a vehicle, the pneumatic tire 1 is mounted on a rim wheel R (see FIG. 9) by fitting the rim wheel R on the bead portion 10, and in a state of being inflated by filling the inside with air, the pneumatic tire 1 is mounted on the vehicle. In a case where the vehicle equipped with the pneumatic tire 1 is driven, the pneumatic tire 1 rotates with a portion of the ground contact surface 3 located below in the ground contact surface 3 in contact with the road surface. The vehicle is driven by transferring a driving force or a braking force to the road surface, using the frictional force between the ground contact surface 3 and the road surface, or by generating a turning force.

For example, in a case where the vehicle equipped with the pneumatic tire 1 travels on a dry road surface, the vehicle is driven by transferring a driving force or a braking force to the road surface, mainly using the frictional force between the ground contact surface 3 and the road surface, or by generating a turning force. Additionally, in a case where the vehicle equipped with the pneumatic tire 1 travels on a wet road surface, water between the ground contact surface 3 and the road surface enters grooves such as the main grooves 30, the lateral grooves 40, or the like, and the vehicle is driven with the water between the ground contact surface 3 and the road surface drained through the grooves. This facilitates bringing the ground contact surface 3 into contact with the road surface, and the friction force between the ground contact surface 3 and the road surface allows the vehicle to travel as desired.

Additionally, braking the vehicle requires a strong frictional force between the ground contact surface 3 and the road surface. However, in a case of braking on a wet road surface, entry of water between the ground contact surface 3 and the road surface makes exertion of the frictional force difficult. Thus, in a case of braking on a wet road surface, it is important to drain the water between the ground contact surface 3 and the road surface through the grooves such as the main grooves 30 and to ensure a frictional force exerted between the ground contact surface 3 and the road surface. In order to improve the drainage properties between the ground contact surface 3 and the road surface, it is effective to increase the groove area, corresponding to the opening area of the grooves formed in the tread portion 2, and an increased groove area enables the drainage properties to be improved, allowing improvement in the ground contact properties of the ground contact surface 3 during traveling on a wet road surface. Thus, a frictional force can be exerted between the ground contact surface 3 and the road surface, allowing improvement in the wet braking performance, corresponding to braking performance on a wet road surface.

Additionally, on the road surface on which the vehicle travels, a projection such as a stone projecting from the road surface may be present. While the vehicle is traveling, the tread portion 2 of the pneumatic tire 1 may tread on such a projection. In this case, the tread portion 2 is subjected to a strong force from the projection. At this time, in a case where each of the grooves formed in the tread portion 2 has a large groove area and the tread portion 2 has low rigidity, the tread portion 2 has reduced strength at break, and thus the tread portion 2 of the pneumatic tire 1 is likely to be damaged by a large force received from the projection, and the projection may penetrate the tread portion 2. In other words, in the pneumatic tire 1 in which each of the grooves formed in the tread portion 2 has a large groove area and the tread portion 2 has low rigidity, in a case where the projection on the road surface is trodden on, the projection may penetrate the tread portion 2 due to low strength at break, leading to a shock burst.

Figure 9:
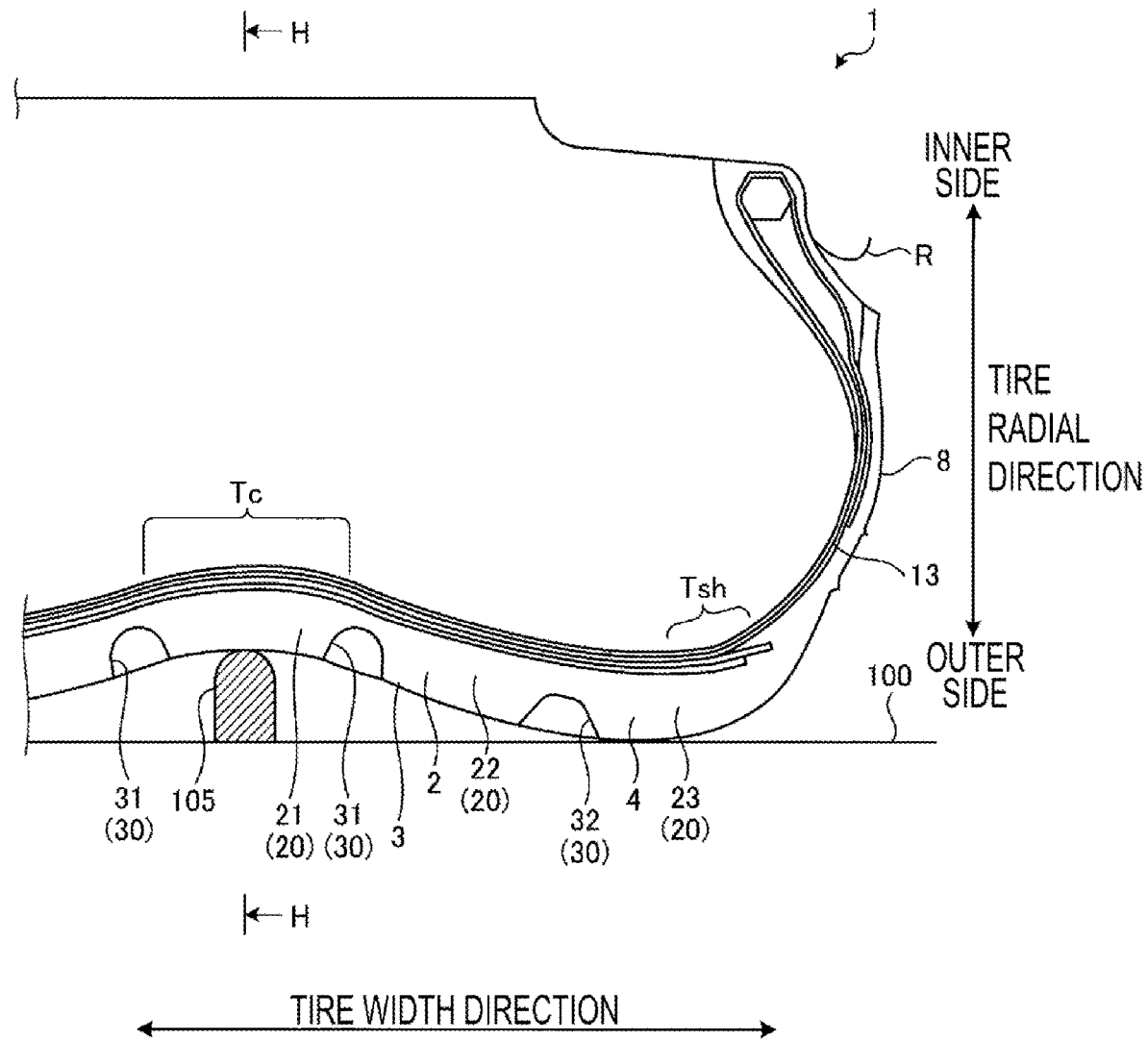
FIG. 9 is an explanatory diagram illustrating a pneumatic tire according to a first embodiment treading on a projection on a road surface.

In contrast, in the pneumatic tire 1 according to the first embodiment, the center region Tc has a large tire average thickness Gc, whereas the shoulder region Tsh has a small tire average thickness Gsh, and thus a shock burst can be suppressed in a case where the groove area is increased. FIG. 9 is an explanatory diagram illustrating a state in which a projection 105 on a road surface 100 is trodden on by the pneumatic tire 1 according to the first embodiment. In the pneumatic tire 1 according to the first embodiment, the strength at break at or near the center in the tire width direction of the tread portion 2 can be increased by increasing the tire average thickness Gc in the center region Tc, and thus even in a case where the projection 105 on the road surface 100 is trodden on at or near the center region Tc, penetration of the tread portion 2 by the projection 105 can be suppressed. Additionally, by reducing the tire average thickness Gsh of the shoulder region Tsh, the shoulder region Tsh can be preferentially deformed in a case where the projection 105 is trodden on at or near the center region Tc of the tread portion 2, allowing the shoulder region Tsh to be easily deformed in the direction in which a region of the center region Tc moves away from the road surface 100. Thus, the pressure applied to the tread portion 2 by the projection 105 can be reduced, allowing suppression of penetration of the tread portion 2 by the projection 105. Accordingly, a shock burst can be suppressed that is caused by treading on the projection 105 during traveling of the vehicle.

Specifically, for the tread portion 2 of the pneumatic tire 1 according to the first embodiment, the relationship between the tire average thickness Gc in the center region Tc and the tire average thickness Gsh in the shoulder region Tsh is within the range of $1.05 \leq (Gc/Gsh) \leq 1.35$, a shock burst can be suppressed, with the wet braking performance ensured. In other words, in a case where the relationship between the tire average thickness Gc of the center region Tc and the tire average thickness Gsh of the shoulder region Tsh is $(Gc/Gsh) < 1.05$, the tire average thickness Gc of the center region Tc is excessively small, leading to difficulty in ensuring the strength at break of the center region Tc. Alternatively, the tire average thickness Gsh of the shoulder region Tsh is excessively large, and thus the shoulder region Tsh is less likely to deform. In a case where the projection 105 is trodden on by the tread portion 2, the shoulder region Tsh is unlikely to deform in the direction in which a region of the center region Tc moves away from the road surface 100. This leads to difficulty in suppressing penetration of the tread portion 2 by the projection 105 trodden on by the tread portion 2.

Additionally, in a case where the relationship between the tire average thickness Gc of the center region Tc and the tire average thickness Gsh of the shoulder region Tsh is $(Gc/Gsh) > 1.35$, the tire average thickness Gc of the center region Tc is excessively large with respect to the tire average thickness Gsh of the shoulder region Tsh, and the shoulder region Tsh may be less likely to contact the ground than the center region. In this case, portions of the ground contact surface 3 at or near the shoulder region Tsh are less likely to contact the ground, and thus in a case where a braking force is exerted by the frictional force between the ground contact surface 3 and the road surface 100 during wet braking, the contribution of portions of the ground contact surface 3 at or near the shoulder region Tsh may decrease. Thus, the overall amount of frictional force between the ground contact surface 3 and the road surface 100 is difficult to exert, leading to difficulty in ensuring the wet braking performance.

In contrast, in a case where the relationship between the tire average thickness Gc of the center region Tc and the tire average thickness Gsh of the shoulder region Tsh is within the range of 1.05≤(Gc/Gsh)≤1.35, the entire ground contact surface 3 from the center region Tc to the shoulder regions Tsh can be provided with appropriate ground contact properties, and a frictional force can be exerted between the ground contact surface 3 and the road surface 100 during wet braking, with the appropriate strength at break of the center region Tc ensured, allowing the ease of deformation of the shoulder region Tsh to be ensured. Thus, a shock burst can be suppressed, with the wet braking performance ensured, allowing shock burst resistance performance to be improved.

Figure 10:
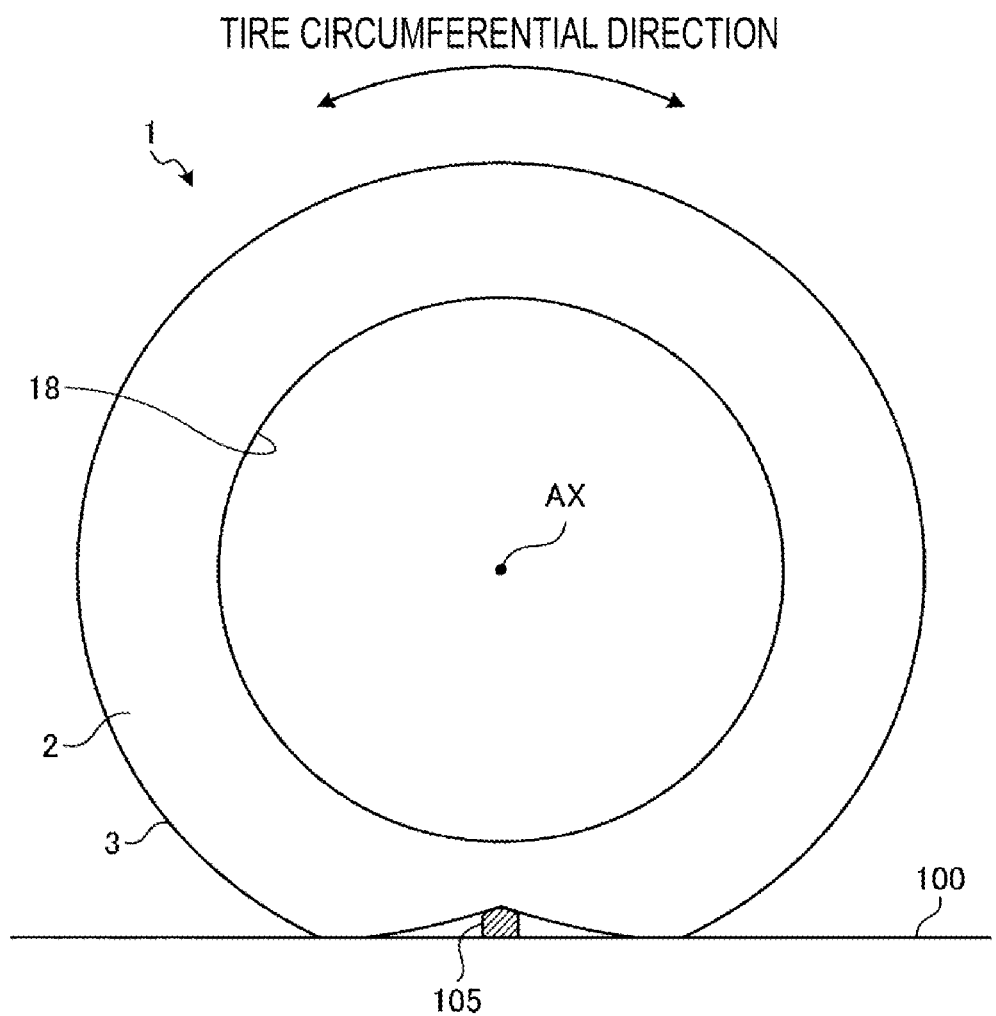
FIG. 10 is a cross-sectional view taken along a line H-H in FIG. 9 and is a schematic view of the pneumatic tire as viewed in a direction along the tire rotation axis.

Additionally, in the tread portion 2, the magnitude of the average lateral groove width Lc of the center region Tc with respect to the tire average thickness Gc in the center region Tc (Lc/Gc) is smaller than the magnitude of the average lateral groove width Lsh of the shoulder region Tsh with respect to the tire average thickness Gsh in the shoulder region Tsh (Lsh/Gsh), and thus the rigidity of the center region Tc can be more reliably ensured. Accordingly, a shock burst can be suppressed. FIG. 10 is a cross-sectional view taken along the line H-H in FIG. 9 and is a schematic view of the pneumatic tire as viewed in a direction along a tire rotation axis Ax. In other words, in a case where the projection 105 on the road surface 100 is trodden on at or near the center region Tc of the tread portion 2, not only a predetermined range of the tread portion 2 in the tire width direction deflects toward the inner side in the tire radial direction according to the size of the projection 105 as illustrated in FIG. 9, but a predetermined range of the tread portion 2 in the tire circumferential direction also deflects toward the inner side in the tire radial direction as illustrated in FIG. 10. In this case, the pneumatic tire 1 according to the first embodiment is formed such that the center region Tc has a relatively small average lateral groove width Lc, and the center region Tc in the tread portion 2 has higher rigidity than the rigidity of the shoulder regions Tsh, and thus the pneumatic tire 1 is unlikely to deform within a local range in the tire circumferential direction.

Thus, even in a case where the projection 105 is trodden on at or near the center region Tc of the tread portion 2, significant deformation of a local range of the tread portion 2 in the tire circumferential direction is suppressed, facilitating deflection over a wide range in the tire circumferential direction. This allows stress concentration of the tread portion 2 to be mitigated in a case where the projection 105 is trodden on, thus enabling suppression of damage to reinforcing members such as the belt layer 14 and the carcass layer 13 due to stress concentration, allowing shock burst resistance performance to be improved.

Additionally, since the tire average thickness Gsh in the shoulder region Tsh is smaller than the tire average thickness Gc in the center region Tc, the appropriate groove depth and the drainage properties are difficult to ensure. However, by making the average lateral groove width Lsh of the shoulder region Tsh relatively large, the drainage properties of the shoulder region Tsh can be ensured. Thus, in a case of braking on a wet road surface, a frictional force can be exerted between the ground contact surface 3 of the shoulder region Tsh and the road surface 100, allowing the wet braking performance to be ensured.

Additionally, the relationship between the average lateral groove width Lc of the center region Tc and the tire average thickness Gc in the center region Tc is within the range of 0.07≤(Lc/Gc)≤0.12, and thus a shock burst can be suppressed, with the wet braking performance ensured. In other words, in a case where the relationship between the average lateral groove width Lc of the center region Tc and the tire average thickness Gc in the center region Tc is (Lc/Gc) <0.07, the average lateral groove width Lc of the center region Tc is excessively small, leading to excessively low drainage properties of the center region Tc. In this case, in a case of braking on a wet road surface, a frictional force is difficult to exert between the ground contact surface 3 of the center region Tc and the road surface 100, leading to difficulty in ensuring the wet breaking performance. Additionally, in a case where the relationship between the average lateral groove width Lc of the center region Tc and the tire average thickness Gc in the center region Tc is (Lc/Gc) >0.12, the average lateral groove width Lc of the center region Tc is excessively large, leading to difficulty in ensuring the rigidity of the center region Tc. In this case, it is difficult to suppress deformation of a local range in the tire circumferential direction in a case where the projection 105 is trodden on at or near the center region Tc, and thus stress concentration of the tread portion 2 is difficult to mitigate, leading to difficulty in suppressing a shock burst.

In contrast, in a case where the relationship between the average lateral groove width Lc of the center region Tc and the tire average thickness Gc in the center region Tc is within the range of 0.07≤(Lc/Gc)≤0.12, the rigidity of the center region Tc of the tread portion 2 can be ensured, with excessively low drainage properties of the center region Tc suppressed. Thus, a shock burst can be suppressed, with the wet braking performance ensured.

Additionally, the relationship between the average lateral groove width Lsh of the shoulder region Tsh and the tire average thickness Gsh in the shoulder region Tsh is within the range of 0.17≤(Lsh/Gsh)≤0.26, and thus a shock burst can be suppressed, with the wet braking performance ensured. In other words, in a case where the relationship between the average lateral groove width Lsh of the shoulder region Tsh and the tire average thickness Gsh in the shoulder region Tsh is (Lsh/Gsh)<0.17, the average lateral groove width Lsh of the shoulder region Tsh is excessively small, leading to excessively low drainage properties of the shoulder region Tsh. In this case, in a case where braking on a wet road surface, the frictional force between the ground contact surface 3 of the shoulder regions Tsh and the road surface 100 is difficult to ensure, and thus it is difficult to ensure wet braking performance. Additionally, in a case where the relationship between the average lateral groove width Lsh of the shoulder region Tsh and the tire average thickness Gsh in the shoulder region Tsh is (Lsh/Gsh)>0.26, the average lateral groove width Lsh of the shoulder region Tsh is excessively large, leading to excessively low rigidity of the shoulder region Tsh. In this case, even in a case where the rigidity of the center region Tc is ensured, the excessively low rigidity of the shoulder region Tsh makes deformation of the local range in the tire circumferential direction difficult to suppress in a case where the projection 105 is trodden on by the tread portion 2. This makes stress concentration difficult to mitigate and a shock burst difficult to suppress, the stress concentration being caused by deformation of the tread portion 2 due to a force applied by the projection 105, in a case where the projection 105 is trodden on.

In contrast, in a case where the relationship between the average lateral groove width Lsh of the shoulder region Tsh and the tire average thickness Gsh in the shoulder region Tsh is within the range of 0.17≤(Lsh/Gsh)≤0.26, excessively low drainage properties of the shoulder region Tsh can be suppressed, and excessively low rigidity of the shoulder region Tsh can be suppressed. Thus, a shock burst can be suppressed, with the wet braking performance ensured. As a result, both wet braking performance and shock burst resistance performance can be provided in a compatible manner.

Additionally, for the lateral grooves 40 located in the center region Tc, the ratio between the pitches p adjacent in the tire circumferential direction is within the range of 0.7 times or greater and 1.3 times or less, stress concentration of the tread portion 2 can be more reliably mitigated in a case where the projection 105 is trodden on, allowing a shock burst to be more reliably suppressed. In other words, in a case where the ratio between the pitches p adjacent in the tire circumferential direction is less than 0.7 times or greater than 1.3 times, an excessively significant change may occur in the rigidity of the center region Tc as viewed in the tire circumferential direction. This may lead to difficulty in suppressing significant deformation of the local range in the tire circumferential direction in a case where the projection 105 is trodden on at or near the center region Tc.

In contrast, for the lateral grooves 40 located in the center region Tc, in a case where the ratio between the pitches P adjacent in the tire circumferential direction is within the range of 0.7 times or greater and 1.3 times or less, an excessively significant change in the rigidity of the center region Tc as viewed in the tire circumferential direction can be suppressed. Thus, significant deformation in the local region in the tire circumferential direction can be more reliably suppressed in a case where the projection 105 is trodden on at or near the center region Tc, allowing stress concentration of the tread portion 2 to be more reliably mitigated in a case where the projection 105 is trodden. As a result, the shock burst resistance performance can be more reliably improved.

Additionally, for the lateral grooves 40 located in the center region Tc, the length WL in the tire width direction with respect to the width Wc of the center land portion 21 in the tire width direction is within the range of 0.4≤(WL/Wc)≤0.7. Thus, a shock burst can be suppressed, with the wet braking performance more reliably ensured. In other words, in a case where, located in the center region Tc, the length WL of the lateral groove 40 in the tire width direction with respect to the width Wc of the center land portion 21 in the tire width direction is (WL/Wc)<0.4, the length WL of the lateral groove 40 in the tire width direction is excessively small, and thus the center region Tc may have excessively low drainage properties. In this case, in a case of braking on a wet road surface, a frictional force is difficult to exert between the ground contact surface 3 of the center region Tc and the road surface 100, and thus the wet braking performance may be difficult to ensure. In a case where, located in the center region Tc, the length WL of the lateral groove 40 in the tire width direction with respect to the width Wc of the center land portion 21 in the tire width direction is (WL/Wc)>0.7, the length WL of the lateral groove 40 in the tire width direction is excessively large, and thus the rigidity of the center region Tc may be difficult to ensure. In this case, deformation of the local range in the tire circumferential direction is difficult to suppress in a case where the projection 105 is trodden on at or near the center region Tc, and thus a shock burst may be difficult to suppress.

In contrast, in a case where, located in the center region Tc, the length WL of the lateral groove 40 in the tire width direction with respect to the width Wc of the center land portion 21 in the tire width direction is within the range of 0.4≤(WL/Wc)≤0.7, the rigidity of the center region Tc of the tread portion 2 can be ensured, with excessively low drainage properties of the center region Tc suppressed. As a result, both wet braking performance and shock burst resistance performance can be more reliably achieved in a compatible manner.

Additionally, the lateral grooves 40 located in the center region Tc form chamfered sipes 41 each including the chamfered portion 45 and the sipe portion 46, and thus in a case where the projection 105 is trodden on by the center region Tc, the sipe walls 47 of the sipe portion 46 contact and support each other to allow suppression of significant deformation of the center land portion 21. This enables suppression of significant deformation of the local range in the tire circumferential direction in a case where the projection 105 is trodden on by the center region Tc, allowing a shock burst to be more reliably suppressed. Additionally, since the chamfered sipe 41 includes the chamfered portion 45, the chamfered portion 45 allows the drainage properties of the center region Tc to be ensured, and the sipe portion 46 ensures the rigidity of the center region Tc to suppress a shock burst, while allowing the wet braking performance to be ensured. As a result, both wet braking performance and shock burst resistance performance can be more reliably achieved in a compatible manner.

Additionally, for the chamfered sipes 41 located in the center region Tc, the relationship between the depth Dc1 of the chamfered portion 45 and the depth Dc2 of the sipe portion 46 is within the range of 0.2≤(Dc1/Dc2)≤0.5, and thus a shock burst can be suppressed, with the wet braking performance more reliably ensured. In other words, for the chamfered sipes 41 located in the center region Tc, in a case where the relationship between the depth Dc1 of the chamfered portion 45 and the depth Dc2 of the sipe portion 46 is (Dc1/Dc2)<0.2, the depth Dc1 of the chamfered portion 45 is excessively small, and thus the drainage properties of the center region Tc may be difficult to ensure, with the wet braking performance difficult to ensure. Additionally, for the chamfered sipes 41 located in the center region Tc, in a case where the relationship between the depth Dc1 of the chamfered portion 45 and the depth Dc2 of the sipe portion 46 is (Dc1/Dc2)>0.5, the depth Dc2 of the sipe portion 46 is excessively small, and thus the rigidity of the center region Tc may be difficult to ensure, with a shock burst difficult to suppress.

In contrast, for the chamfered sipes 41 located in the center region Tc, in a case where the relationship between the depth Dc1 of the chamfered portion 45 and the depth Dc2 of the sipe portion 46 is within the range of 0.2≤(Dc1/Dc2)≤0.5, the rigidity of the center region Tc can be ensured, with the drainage properties of the center region Tc more reliably ensured. As a result, both wet braking performance and shock burst resistance performance can be more reliably achieved in a compatible manner.

Additionally, the ratio, for the chamfered sipes 41 located in the center region Tc, of the depth Dc1 of the chamfered portion 45 to the depth Dc2 of the sipe portion 46 (Dc1/Dc2) is smaller than the ratio, for the chamfered sipes 51 located in the shoulder region Tsh, of the depth Dsh1 of the chamfered portion 55 to the depth Dsh2 of the sipe portion 56 (Dsh1/Dsh2). The depth Dc2 of the sipe portion 46 of each of the chamfered sipes 41 located in the center region Tc can be made relatively larger, allowing the rigidity of the center region Tc to be more reliably ensured. Thus, significant deformation of the local range in the tire circumferential direction can be more reliably suppressed in a case where the projection 105 is trodden on at or near the center region Tc, allowing stress concentration to be mitigated, and thus a shock burst can be more reliably suppressed. Additionally, the depth Dsh1 of the chamfered portion 55 of each of the chamfered sipes 51 located in the shoulder region Tsh can be made relatively larger, allowing the drainage properties of the shoulder region Tsh to be more reliably ensured. Thus, the chamfered sipes 41 located in the center region Tc are used to suppress a shock burst, while the chamfered sipes 51 located in the shoulder region Tsh are used to more reliably ensure the wet braking performance. As a result, both wet braking performance and shock burst resistance performance can be more reliably achieved in a compatible manner.

Additionally, the chamfered portion 45 of each of the chamfered sipes 41 located in the center region Tc includes a portion formed on only one edge 43 side of the opening 42 in the sipe width direction, and thus the rigidity of the center region Tc can be more reliably ensured. Accordingly, significant deformation of the local range in the tire circumferential direction can be more reliably suppressed in a case where the projection 105 is trodden on at or near the center region Tc, allowing stress concentration to be more reliably mitigated. As a result, the shock burst resistance performance can be more reliably improved.

Additionally, for the chamfered sipes 41 located in the center region Tc, the edge 43 at which the chamfered portion 45 is formed differs between one end side and the other end side in the extension direction of the chamfered sipe 41, and thus in a case where the projection 105 is trodden on at or near the center region Tc to deform portions of the chamfered sipe 41 located on both sides in the sipe width direction, biased deformation can be suppressed. In other words, in a case where the chamfered portion 45 is formed on only one edge 43 side of the opening 42 in order to ensure the rigidity of the center region Tc, the rigidity of the side on which the chamfered portion 45 is located is reduced. Thus, in a case where the portions of the center land portion 21 located on both sides of the chamfered sipe 41 in the sipe width direction are deformed, the side on which the chamfered portion 45 is located is likely to be significantly deformed. In this case, significant deformation of the local range in the tire circumferential direction may be difficult to suppress, and stress concentration may be difficult to suppress.

In contrast, in a case where the edge 43 at which the chamfered portion 45 is formed differs between one end side and the other end side in the extension direction of the chamfered sipe 41, this allows suppression of an excessively significant rigidity difference between the portions of the center land portion 21 located on both sides of the chamfered sipe 41 in the sipe width direction, and in a case where the portions of the center land portion 21 located on both sides of the chamfered sipe 41 in the sipe width direction are deformed, biased deformation can be suppressed. Accordingly, significant deformation of the local range in the tire circumferential direction can be more reliably suppressed in a case where the projection 105 is trodden on at or near the center region Tc, allowing stress concentration to be more reliably mitigated. As a result, the shock burst resistance performance can be more reliably improved.

Second Embodiment

The pneumatic tire 1 according to the second embodiment has a configuration substantially similar to that of the pneumatic tire 1 according to the first embodiment, but includes side reinforcing rubber 60 in the sidewall portion 8. The other components of the second embodiment are similar to the corresponding components of the first embodiment. Thus, descriptions thereof will be omitted, and the components are denoted by the same reference signs.

Figure 11:
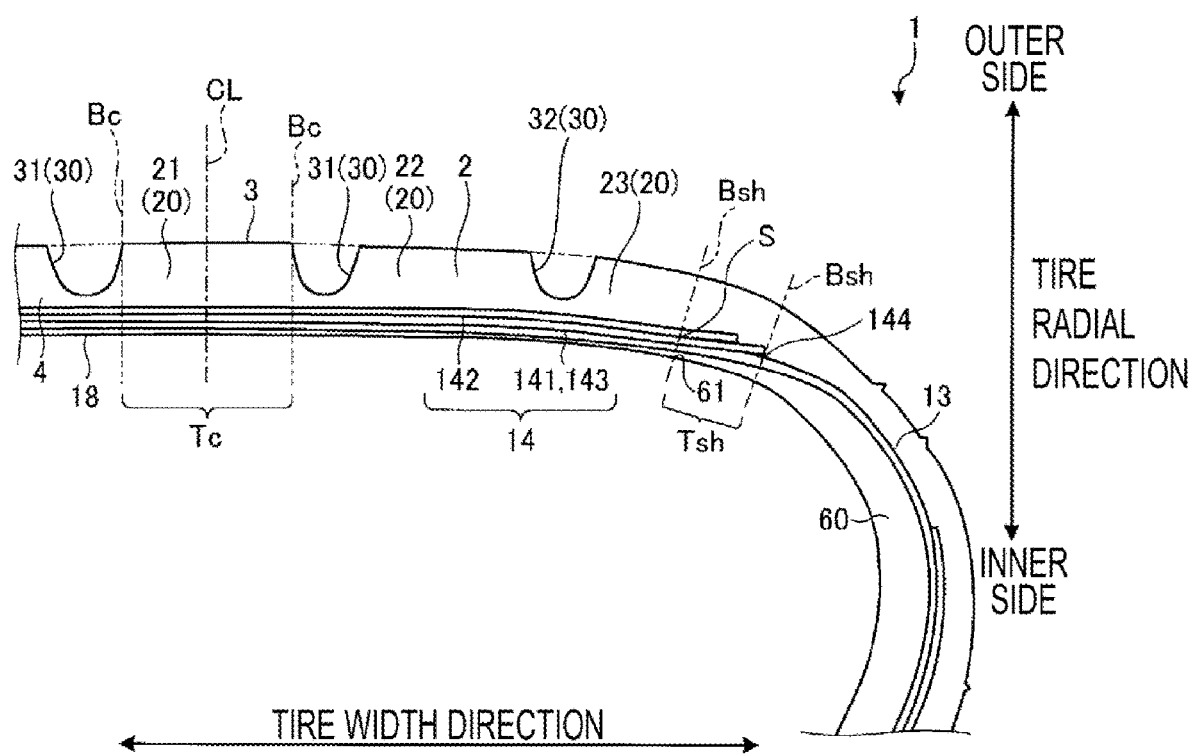
FIG. 11 is a detailed cross-sectional view illustrating a main portion of a pneumatic tire according to a second embodiment.

FIG. 11 is a meridian cross-sectional view illustrating a main portion of the pneumatic tire 1 according to the second embodiment. As in the case of the pneumatic tire 1 according to the first embodiment, in the pneumatic tire 1 according to the second embodiment, the relationship between the tire average thickness Gc in the center region Tc of the tread portion 2 and the tire average thickness Gsh in the shoulder region Tsh of the tread portion 2 is within the range of $1.05 \leq (Gc/Gsh) \leq 1.35$. Additionally, the relationship between the average lateral groove width Lc of the center region Tc and the tire average thickness Gc in the center region Tc is within the range of $0.07 \leq (Lc/Gc) \leq 0.12$, and the relationship between the average lateral groove width Lsh of the shoulder region Tsh and the tire average thickness Gsh in the shoulder region Tsh is within the range of $0.17 \leq (Lsh/Gsh) \leq 0.26$.

Additionally, the pneumatic tire 1 according to the second embodiment includes the side reinforcing rubber 60 in the sidewall portion 8 and is used as a so-called run-flat tire that can be driven even in a case where air escapes due to a puncture or the like. The side reinforcing rubber 60 disposed in the sidewall portion 8 is a rubber member provided inside the sidewall portion 8 and is disposed without being exposed on the tire inner surface or the tire outer surface. Specifically, the side reinforcing rubber 60 is located mainly on the inner side in the tire width direction of each of the portions of the carcass layer 13 located at the sidewall portions 8 and is disposed between the carcass layer 13 and the innerliner 16 in the sidewall portion 8. In the tire meridian cross-section, the side reinforcing rubber 60 is formed in a crescent shape projecting outward in the tire width direction.

The side reinforcing rubber 60 formed in a crescent shape includes an outer end portion 61 corresponding to end portions on the outer side in the tire radial direction and located on the tire radial direction inner side of the belt layer 14 in the tread portion 2, and the side reinforcing rubber 60 and the belt layer 14 are disposed partially overlapping each other in the tire radial direction with the amount of overlap within a predetermined range. Thus, at least a part of the side reinforcing rubber 60 at or near each of the outer end portions 61 is located in the shoulder region Tsh. The side reinforcing rubber 60 thus disposed is formed of a rubber material having higher strength than the rubber forming the sidewall portions 8 and the rim cushion rubber 17 disposed in the bead portions 10.

The portion at or near the outer end portion 61 of the side reinforcing rubber 60 may be located not only in the shoulder region Tsh, but also partially on the inner side of the shoulder region Tsh in the tire width direction. Additionally, in a case where a part of the side reinforcing rubber 60 is located on the inner side of the shoulder region Tsh in the tire width direction, a thickness including the side reinforcing rubber 60 is used as the tire average thickness Gsh in the shoulder region Tsh.

In the pneumatic tire 1 according to the second embodiment, the side reinforcing rubber 60 is disposed on the inner side of the sidewall portion 8, and thus the bending rigidity of the sidewall portion 8 is increased. In other words, even in a case where air escapes due to a puncture or the like and a heavy load is applied to the sidewall portions 8, deformation of the sidewall portions 8 can be reduced, and driving can be performed at a predetermined speed or lower.

On the other hand, in a run-flat tire, the side reinforcing rubber 60 is disposed in the sidewall portions 8 to increase the bending rigidity of each of the sidewall portions 8, and thus the sidewall portions 8 are less likely to deflect in a case where the projection 105 is trodden on by the run-flat tire inflated to an appropriate internal pressure. As a result, stress in the tread portion 2 in a case where the projection 105 is trodden on is easily concentrated, and a shock burst is more likely to occur.

In contrast, with the pneumatic tire 1 according to the second embodiment, the tire average thickness Gc in the center region Tc is thick, and the tire average thickness Gsh in the shoulder region Tsh is reduced. As a result, in a case where the projection 105 is trodden on the tread portion 2, the shoulder region Tsh is more likely to deform. This enables a reduction in pressure applied to the tread portion 2 by the projection 105 in a case where the projection 105 is trodden on, allowing suppression of a possible shock burst caused by penetration of the tread portion 2 by the projection 105. As a result, both run-flat performance and shock burst resistance performance can be achieved in a compatible manner.

Modified Examples

Figure 12:
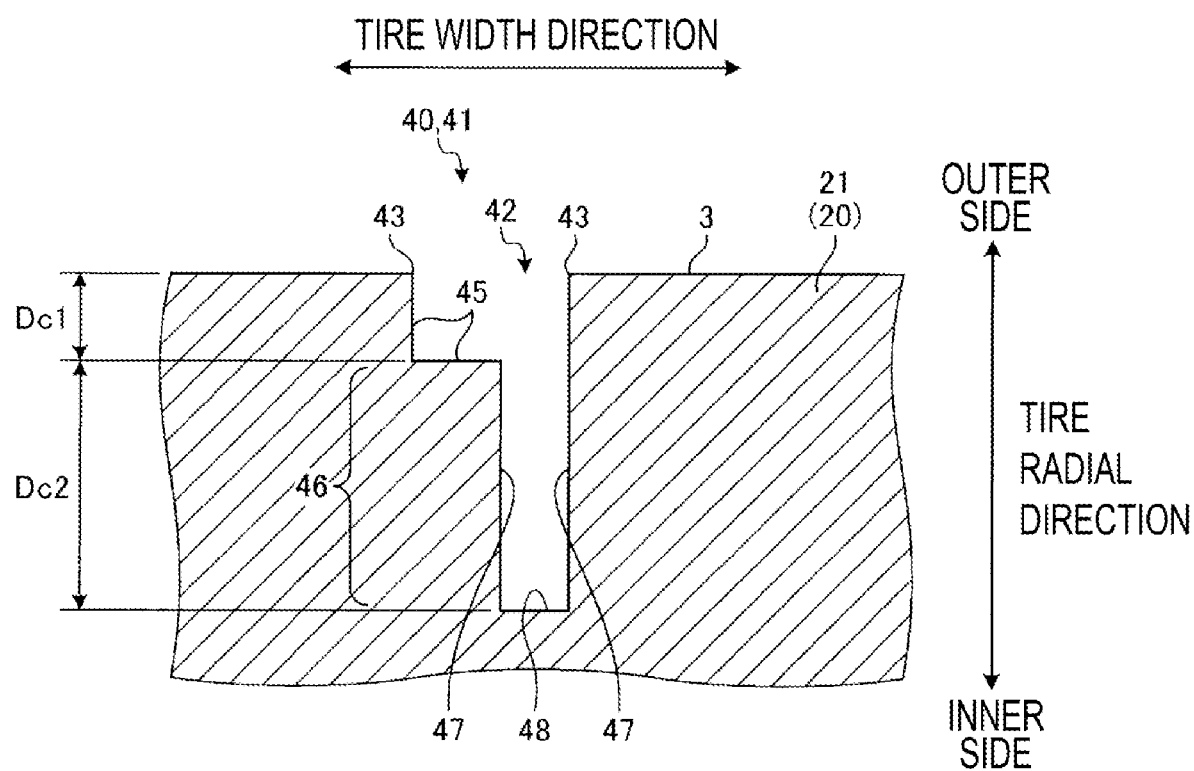
FIG. 12 is an explanatory diagram of a modified example of the pneumatic tire according to the first embodiment in a case in which a chamfered portion is formed from two faces.

Note that, in the first embodiment described above, in the chamfered sipes 41 formed in the center land portion 21 and located in the center region Tc and in the chamfered sipes 51 formed in the shoulder land portion 23 and located in the shoulder region Tsh, the chamfered portions 45 and 55 are each formed as a surface connecting the ground contact surface 3 and the corresponding one of the sipe walls 47 and 57, but that the chamfered portions 45 and 55 may each be formed in any other shape. FIG. 12 is an explanatory diagram illustrating a modified example of the pneumatic tire 1 according to the first embodiment in which the chamfered portion 45 is formed from two surfaces. For example, as illustrated in FIG. 12, the chamfered portion 45 of each of the chamfered sipes 41 formed in the center land portion 21 may be formed by connecting the ground contact surface 3 and the sipe wall 47 by a plurality of planes. In other words, the chamfered portion 45 may be formed in a stepped shape by connecting, to the ground contact surface 3, a surface substantially parallel to the sipe wall 47, by connecting, to the sipe wall 47, a surface substantially parallel to the ground contact surface 3, and by connecting the two surfaces to each other. Also in a case where the chamfered portion 45 is thus formed in a stepped shape, for the chamfered sipes 41 located in the center region Tc, the relationship between the depth Dc1 of the chamfered portion 45 and the depth Dc2 of the sipe portion 46 in the sipe depth direction is preferably represented by the range of $0.2 \leq (Dc1/Dc2) \leq 0.5$.

The chamfered portion 55 of each of the chamfered sipes 51 formed in the shoulder land portion 23 may also be formed in a stepped shape. The chamfered portion 45 of each of the chamfered sipes 41 located in the center region Tc and the chamfered portion 55 of each of the chamfered sipes 51 located in the shoulder region Tsh preferably have shapes set as appropriate in consideration of the rigidity and drainage properties of each of the regions.

Additionally, in the first embodiment described above, the lateral grooves 40 located in the center region Tc and the shoulder region Tsh form the chamfered sipes 41 and 51, but the lateral grooves 40 located in the center region Tc and the shoulder region Tsh may include grooves other than the chamfered sipes 41 and 51. Additionally, the lateral grooves 40 formed in the second land portion 22 may also include grooves other than the chamfered sipes. The form of each lateral groove 40 is preferably set as appropriate in consideration of the rigidity and drainage properties of the corresponding land portion 20.

Figure 13:
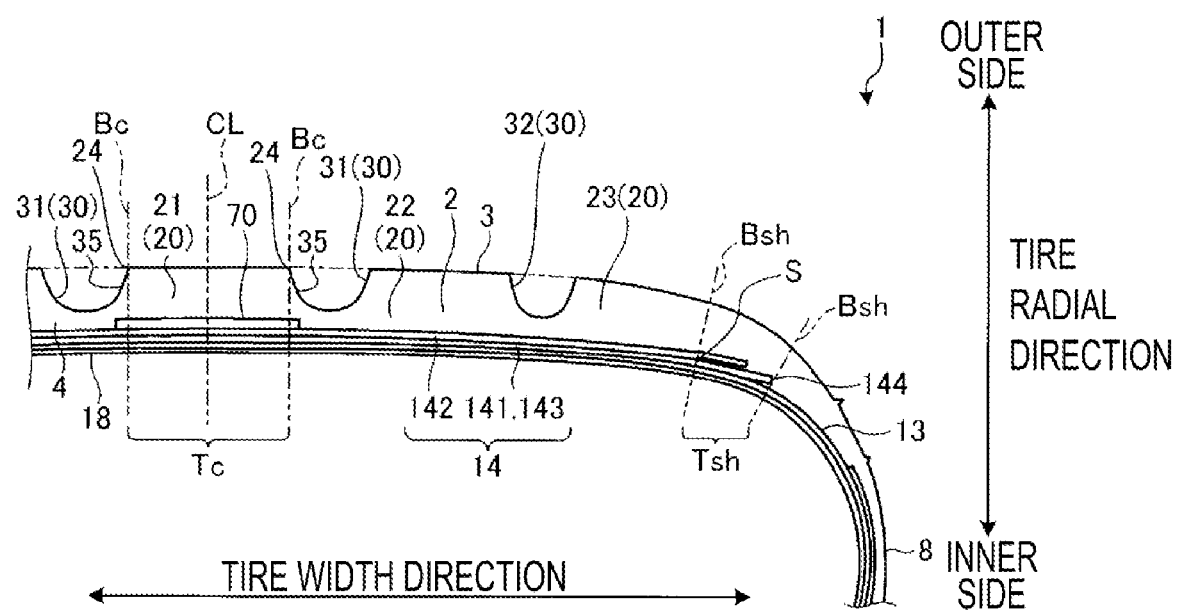
FIG. 13 is an explanatory diagram of a modified example of the pneumatic tire according to the first embodiment in a case where a belt protective rubber layer is disposed.

Additionally, in the first embodiment described above, the tread rubber layer 4 is laminated directly on the outer side of the belt layer 14 in the tire radial direction. However, any other member may be disposed on the outer side of the belt layer 14 in the tire radial direction. FIG. 13 is an explanatory diagram of a modified example of the pneumatic tire according to the first embodiment in a case where a belt protective rubber layer 70 is disposed. For example, as illustrated in FIG. 13, the belt protective rubber layer 70 formed of a rubber composition may be disposed on the outer side of the belt layer 14 in the tire radial direction in the center region Tc. In this case, the belt protective rubber layer 70 is disposed on the outer side of the belt layer 14 in the tire radial direction and on the inner side of the tread rubber layer 4 in the tire radial direction. In other words, the belt protective rubber layer 70 is disposed sandwiched between the belt layer 14 and the tread rubber layer 4. The belt protective rubber layer 70 disposed in this manner has strength at break in the range of from 18 MPa or higher to 25 MPa or lower.

Additionally, for the belt protective rubber layer 70 illustrated in FIG. 13, the width in the tire width direction is larger than the width of the center region Tc in the tire width direction, and end portions on both sides in the tire width direction are located on the outer side in the tire width direction of the center region boundary lines Bc indicating the positions of the end portions of the center region Tc in the tire width direction. Thus, the belt protective rubber layer 70 is disposed all across the center region Tc in the tire width direction. With the belt protective rubber layer 70 thus disposed on the outer side of the belt layer 14 in the center region Tc in the tire radial direction, the strength at break of the center region Tc can be more reliably ensured. As a result, the shock burst resistance performance can be more reliably improved.

Additionally, a belt reinforcing layer (not illustrated) may be disposed on the outer side of the belt layer 14 in the tire radial direction, the belt reinforcing layer being configured by coating, with coating rubber, a plurality of reinforcing cords including steel or an organic fiber material and then performing a rolling process on the coating rubber-covered reinforcing cords, as in the case of the belt 141 and 142. In this case, the tread rubber layer 4 is disposed on the outer side of the belt reinforcing layer in the tire radial direction. The thus disposed belt reinforcing layer improves the strength at break of the tread portion 2 and facilitates protection of the belt layer 14, allowing the shock resistance burst performance to be more reliably improved.

In the above-described first embodiment, four main grooves 30 are formed, but the number of the main grooves 30 may be other than four. In the above-described first embodiment, the center region Tc aligns with the range in the tire width direction of the center land portion 21 corresponding to the land portion 20 located on the tire equatorial plane CL. However, the center region Tc need not be located on the tire equatorial plane CL. For example, in a case where the main groove 30 is located on the tire equatorial plane CL, the center region Tc may correspond to the range in the tire width direction of the land portion 20 defined by the main groove 30 located on the tire equatorial plane CL and the main groove 30 located second closest to the tire equatorial plane CL. In other words, of the regions each sandwiched between two adjacent main grooves 30, the region closest to the tire equatorial plane CL may be used as the center region Tc.

Additionally, the first and second embodiments and the modified example described above may be combined as appropriate. In the pneumatic tire 1, in a case where at least the relationship between the tire average thickness Gc in the center region Tc of the tread portion 2 and the tire average thickness Gsh of the shoulder region Tsh of the tread portion 2 is within the range of $1.05 \leq (Gc/Gsh) \leq 1.35$, the relationship between the average lateral groove width Lc of the center region Tc and the tire average thickness Gc in the center region Tc is within the range of $0.07 \leq (Lc/Gc) \leq 0.12$, and the relationship between the average lateral groove width Lsh of the shoulder region Tsh and the tire average thickness Gsh in the shoulder region Tsh is within the range of $0.17 \leq (Lsh/Gsh) \leq 0.26$, both wet braking performance and shock burst resistance performance can be achieved in a compatible manner.

Examples

FIG. 14A and FIG. 14B are tables showing the results of performance evaluation tests of pneumatic tires. In relation to the pneumatic tire 1 described above, description will be given of performance evaluation tests conducted on a pneumatic tire according to Conventional Example, the pneumatic tires 1 according to embodiments of the present technology, and pneumatic tires according to Comparative Examples to be compared with pneumatic tires 1 according to the embodiments of the present technology. Performance evaluation tests were performed on the shock burst resistance performance, corresponding to durability against a shock burst, and the wet braking performance, corresponding to braking performance on a wet road surface.

The performance evaluation tests are performed using pneumatic tires 1 each having a tire nominal size of 245/50R19 105 W defined by JATMA and mounted on a rim wheel having a rim size of 19×7.5 J and conforming with JATMA standards. For the evaluation method for each of the test items, the shock burst resistance performance is evaluated by inflating the test tire to an air pressure of 220 kPa, performing a plunger breaking test in accordance with JIS K6302 at a plunger diameter of 19 mm and an insertion speed of 50 mm/minute, and measuring tire breaking energy. Shock burst resistance performance is expressed as index values with Conventional Example described below being assigned the value of 100. Larger index values indicate superior tire strength and superior shock burst resistance performance.

Additionally, for the wet braking performance, the test tire is inflated to an air pressure of 230 kPa, the test tire is mounted on a SUV vehicle having an engine displacement of 2500 cc and used as a test vehicle, braking is started at an initial velocity of 100 km/h on a straight test course including an asphalt pavement sprinkled with water, and the traveling distance until stop is measured as a braking distance [m]. The wet braking performance is expressed as index values corresponding to the reciprocals of the measurement values of the braking distance, with Conventional Example described below being assigned the value of 100. Larger index values indicate shorter braking distance and superior wet braking performance.

The performance evaluation tests are performed on 15 types of pneumatic tires including a pneumatic tire according to Conventional Example corresponding to an example of a conventional pneumatic tire, Examples 1 to 11 corresponding to the pneumatic tires 1 according to embodiments of the present technology, and Comparative Examples 1 to 3 corresponding to pneumatic tires to be compared with the pneumatic tires 1 according to the embodiments of the present technology. Of the pneumatic tires, for the pneumatic tire according to Conventional Example, the relationship between the tire average thickness Gc in the center region Tc of the tread portion 2 and the tire average thickness Gsh in the shoulder region Tsh of the tread portion 2 does not satisfy $(Gc/Gsh) \geq 1.05$, and the ratio of the average lateral groove width Lc to the tire average thickness Gc in the center region Tc (Lc/Gc) has the same magnitude as that of the ratio of the average lateral groove width Lsh to the tire average thickness Gsh in the shoulder region Tsh (Lsh/Gsh).

Additionally, for the pneumatic tire according to Comparative Example 1, the relationship between the tire average thickness Gc in the center region Tc of the tread portion 2 and the tire average thickness Gsh in the shoulder region Tsh of the tread portion 2 does not satisfy $(Gc/Gsh) \leq 1.35$, and for the pneumatic tire according to Comparative Example 2, the relationship between the tire average thickness Gc in the center region Tc of the tread portion 2 and the tire average thickness Gsh in the shoulder region Tsh of the tread portion 2 does not satisfy $(Gc/Gsh) \geq 1.05$. Additionally, for the pneumatic tire according to Comparative Example 3, the relationship between the average lateral groove width Lc of the center region Tc and the tire average thickness Gc in the center region Tc is not within the range of $0.07 \leq (Lc/Gc) \leq 0.12$, and the relationship between the average lateral groove width Lsh of the shoulder region Tsh and the tire average thickness Gsh in the shoulder region Tsh is not within the range of $0.17 \leq (Lsh/Gsh) \leq 0.26$.

In contrast, in all of Examples 1 to 11 corresponding to examples of the pneumatic tire 1 according to embodiments of the present technology, the relationship between the tire average thickness Gc in the center region Tc of the tread portion 2 and the tire average thickness Gsh in the shoulder region Tsh of the tread portion 2 is within the range of $1.05 \leq (Gc/Gsh) \leq 1.35$, the relationship between the average lateral groove width Lc of the center region Tc and the tire average thickness Gc in the center region Tc is within the range of $0.07 \leq (Lc/Gc) \leq 0.12$, and the relationship between the average lateral groove width Lsh of the shoulder region Tsh and the tire average thickness Gsh in the shoulder region Tsh is within the range of $0.17 \leq (Lsh/Gsh) \leq 0.26$. Furthermore, the pneumatic tires 1 according to Examples 1 to 11 vary in terms of: the ratio between adjacent pitches P of the lateral grooves 40 located in the center region Tc; the length WL of the lateral grooves 40 in the tire width direction with respect to the width Wc of the center land portion 21 (WL/Wc); the form of each of the lateral grooves 40 located in the center region Tc; the relationship, for the chamfered sipes 41 located in the center region Tc, between the depth Dc1 of the chamfered portion 45 and the depth Dc2 of the sipe portion 46 (Dc1/Dc2); the relationship, for the chamfered sipes 51 located in the shoulder region Tsh, between the depth Dsh1 of the chamfered portion 55 and the depth Dsh2 of the sipe portion 56 (Dsh1/Dsh2); and whether the position of the chamfered portion 45 is reversed between the one end side and the other end side of the chamfered sipe 41 or not.

The results of the performance evaluation tests using the pneumatic tires 1 indicate that, as indicated in FIGS. 14A and 14B, the pneumatic tires 1 according to Examples 1 to 11 can improve the shock burst resistance performance with respect to Conventional Example without degrading the wet braking performance with respect to Conventional Example. In other words, the pneumatic tires 1 according to Examples 1 to 11 can achieve both wet braking performance and shock burst resistance performance in a compatible manner.

The invention claimed is:

1. A pneumatic tire, comprising: at least one carcass layer; a belt layer disposed on an outer side in a tire radial direction of a portion of the carcass layer located in a tread portion, a plurality of belts being layered in the belt layer; and a tread rubber layer disposed on an outer side in the tire radial direction of the belt layer in the tread portion, the tread portion being provided with main grooves extending in a tire circumferential direction and lateral grooves extending in a tire width direction, a plurality of land portions being defined by the main grooves, for the tread portion, in a case where a center region is a region in which a center land portion corresponding to the land portion of the plurality of land portions closest to a tire equatorial plane is located, shoulder regions are each a region between a position corresponding to 85% of a width in the tire width direction of a widest belt corresponding to the belt, the belt being widest in the width in the tire width direction and included in the plurality of the belts of the belt layer, and an end portion of the widest belt in the tire width direction, an average lateral groove width Lc of the center region is a value obtained by dividing groove area of the lateral grooves located in the center region by a circumferential length of the center region, and an average lateral groove width Lsh of the shoulder region is a value obtained by dividing groove area of the lateral grooves located in the shoulder region by a circumferential length of the shoulder region, a relationship between a tire average thickness Gc in the center region and a tire average thickness Gsh in the shoulder region being within a range of 1.05≤(Gc/Gsh) ≤1.35, a relationship between the average lateral groove width Lc of the center region and the tire average thickness Gc in the center region being within a range of 0.07≤ (Lc/Gc)≤0.12, and a relationship between the average lateral groove width Lsh of the shoulder region and the tire average thickness Gsh in the shoulder region being within a range of 0.17≤(Lsh/Gsh) ≤0.26, wherein the lateral grooves located in the center region are chamfered sipes each comprising a chamfer formed at an opening portion opening to a ground contact surface of the tread portion, the chamfered sipes comprise: a chamfered portion formed at the opening portion; and a sipe portion formed between the chamfered portion and a sipe bottom, the lateral grooves located in the shoulder regions are the chamfered sipes, and a ratio, for the chamfered sipes located in the center region, of a depth Dc1 of the chamfered portion in the sipe depth direction to a depth Dc2 of the sipe portion in the sipe depth direction (Dc1/Dc2) is smaller than a ratio, for the chamfered sipes located in the shoulder region, of a depth Dsh1 of the chamfered portion in the sipe depth direction to a depth Dsh2 of the sipe portion in a sipe depth direction (Dsh1/Dsh2).

2. The pneumatic tire according to claim 1, wherein, for the lateral grooves located in the center region, in a case where a pitch of the lateral grooves is a distance in the tire circumferential direction between the lateral grooves adjacent in the tire circumferential direction, a ratio between the pitches adjacent in the tire circumferential direction is within a range of 0.7 times or greater and 1.3 times or less.

3. The pneumatic tire according to claim 1, wherein, for the lateral grooves located in the center region, a length WL in the tire width direction with respect to a width Wc of the center land portion in the tire width direction is within a range of 0.4≤(WL/Wc)≤0.7.

4. The pneumatic tire according to claim 1, wherein, for the chamfered sipes located in the center region, a relationship between a depth Dc1 of the chamfered portion in a sipe depth direction and a depth Dc2 of the sipe portion in the sipe depth direction is within a range of 0.2≤(Dc1/Dc2)≤0.5.

5. The pneumatic tire according to claim 1, wherein the chamfered portion of each of the chamfered sipes located in the center region comprises a portion formed on only one side of an edge of the opening portion in a sipe width direction.

6. The pneumatic tire according to claim 5, wherein, for the chamfered sipes located in the center region, the edge at which the chamfered portion is formed differs between one end side and an other end side of the chamfered sipe in an extension direction.

7. The pneumatic tire according to claim 2, wherein, for the lateral grooves located in the center region, a length WL in the tire width direction with respect to a width Wc of the center land portion in the tire width direction is within a range of 0.4≤(WL/Wc)≤0.7.

8. The pneumatic tire according to claim 7, wherein, for the chamfered sipes located in the center region, a relationship between a depth Dc1 of the chamfered portion in a sipe depth direction and a depth Dc2 of the sipe portion in the sipe depth direction is within a range of 0.2≤(Dc1/Dc2)≤0.5.

9. The pneumatic tire according to claim 8, wherein the chamfered portion of each of the chamfered sipes located in the center region comprises a portion formed on only one side of an edge of the opening portion in a sipe width direction.

10. The pneumatic tire according to claim 9, wherein, for the chamfered sipes located in the center region, the edge at which the chamfered portion is formed differs between one end side and an other end side of the chamfered sipe in an extension direction.

* * * * *